US009628468B2

(12) United States Patent
Manza et al.

(10) Patent No.: US 9,628,468 B2
(45) Date of Patent: Apr. 18, 2017

(54) WEB-BASED SINGLE SIGN-ON WITH FORM-FILL PROXY APPLICATION

(71) Applicant: Oracle International Corporation, Redwood Shore, CA (US)

(72) Inventors: Marc B. Manza, Lindenhurst, NY (US); Ayman Sorial, Durham, NC (US); Anthony Robert Valenti, Farmingdale, NY (US); Yitzchak Weiser, University Heights, OH (US); Andrew Bennett Folkins, Edmonton (CA)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/493,218

(22) Filed: Sep. 22, 2014

(65) Prior Publication Data

US 2015/0089579 A1  Mar. 26, 2015

Related U.S. Application Data

(60) Provisional application No. 61/880,800, filed on Sep. 20, 2013.

(51) Int. Cl.
*H04L 29/06* (2006.01)
*G06F 21/41* (2013.01)

(52) U.S. Cl.
CPC .......... *H04L 63/0815* (2013.01); *G06F 21/41* (2013.01); *H04L 63/0838* (2013.01);
(Continued)

(58) Field of Classification Search
CPC ............. H04L 63/0815; H04L 63/0838; H04L 63/0884; G06F 21/41
See application file for complete search history.

(56) References Cited

U.S. PATENT DOCUMENTS 6,243,816 B1  6/2001  Fang et al.
6,892,307 B1 *  5/2005  Wood ...................... G06F 21/41
                                                  713/155
(Continued)

FOREIGN PATENT DOCUMENTS

CN     105659557     6/2016
CN     105684388     6/2016
(Continued)

OTHER PUBLICATIONS

Non-Final Office Action dated Oct. 5, 2015, for U.S. Appl. No. 14/493,229, 12 pages.
(Continued)

*Primary Examiner* — Syed Zaidi
(74) *Attorney, Agent, or Firm* — Kilpatrick Townsend & Stockton LLP

(57) ABSTRACT

Web-based single sign-on can enable a user to log in to a single interface (such as through a web browser or thin client) and then provide SSO services to the user for one or more web applications. The web-based SSO system can be extended to support one or more different access control methods, such as form-fill, Federated (OIF), SSO Protected (OAM), and other policies. The web-based SSO system can include a user interface through which the user can access different web applications, systems, etc. and manage their credentials. Each SSO service can be associated with a web interface allowing the SSO services to be accessed over the web. The web interfaces can provide CRUD (create, read, update, delete) functionality for each SSO service. To support different access policy types, the web-based SSO system can include an extensible data manager that can manage data access to different types of repositories transparently.

14 Claims, 17 Drawing Sheets

(52) U.S. Cl.
CPC .......... *H04L 63/0884* (2013.01); *H04L 63/10* (2013.01); *H04L 63/20* (2013.01)

(56) References Cited

U.S. PATENT DOCUMENTS

| | | |
|---|---|---|
| 7,412,720 B1 | 8/2008 | Frey et al. |
| 8,365,282 B2 | 1/2013 | Martin et al. |
| 8,613,070 B1 | 12/2013 | Borzycki et al. |
| 9,009,806 B2 | 4/2015 | Hyland et al. |
| 9,110,659 B2 | 8/2015 | Chappel |
| 2002/0023059 A1 | 2/2002 | Bari et al. |
| 2004/0158746 A1 | 8/2004 | Hu et al. |
| 2006/0075475 A1 | 4/2006 | Boulos et al. |
| 2006/0271689 A1 | 11/2006 | Kikuchi |
| 2007/0101418 A1* | 5/2007 | Wood ............... G06F 21/31 726/8 |
| 2007/0206748 A1* | 9/2007 | Cassanova ............ H04M 15/06 379/142.01 |
| 2008/0066150 A1 | 3/2008 | Lim |
| 2009/0199277 A1 | 8/2009 | Norman et al. |
| 2010/0037046 A1 | 2/2010 | Ferg et al. |
| 2011/0138453 A1 | 6/2011 | Verma et al. |
| 2011/0145915 A1 | 6/2011 | Gnech et al. |
| 2012/0011578 A1 | 1/2012 | Hinton et al. |
| 2012/0167193 A1* | 6/2012 | Gargaro ............... G06F 21/41 726/8 |
| 2012/0216133 A1* | 8/2012 | Barker ............... G06F 21/629 715/760 |
| 2013/0086210 A1 | 4/2013 | Yiu et al. |
| 2013/0125226 A1 | 5/2013 | Shah et al. |
| 2015/0089580 A1 | 3/2015 | Kolli et al. |
| 2015/0089619 A1 | 3/2015 | Manza et al. |
| 2015/0089620 A1 | 3/2015 | Uchil et al. |

FOREIGN PATENT DOCUMENTS

| | | |
|---|---|---|
| EP | 3047629 A1 | 7/2016 |
| WO | 2011/023456 A2 | 3/2011 |
| WO | 2015/042546 A1 | 3/2015 |
| WO | 2015/042547 A1 | 3/2015 |

OTHER PUBLICATIONS

Non-Final Office Action dated Dec. 9, 2015, for U.S. Appl. No. 14/493,224, 15 pages.

Oracle. (Mar. 2013). "Oracle Enterprise Single Sign-on Suite Plus 11gR2 PS1," Oracle White Paper, 27 pages.

International Search Report and Written Opinion of the International Searching Authority mailed on Dec. 22, 2014 for PCT Patent Application No. PCT/US2014/056833, 9 pages.

International Search Report and Written Opinion of the International Searching Authority mailed on Dec. 19, 2014 for PCT Patent Application No. PCT/US2014/056835, 11 pages.

Non-Final Office Action dated Mar. 28, 2016, for U.S. Appl. No. 14/493,229, 16 pages.

Non-Final Office Action mailed Mar. 2, 2016, for U.S. Appl. No. 14/493,236, 19 pages.

Non-Final Office Action mailed Mar. 28, 2016, for U.S. Appl. No. 14/493,220, 16 pages.

Final Office Action dated Jul. 14, 2016 for U.S. Appl. No. 14/493,224, 14 pages.

Advisory Action dated Jul. 6, 2016, for U.S. Appl. No. 14/493,229, 5 pages.

Final Office Action dated Mar. 28, 2016, for U.S. Appl. No. 14/493,229, 14 pages.

International Preliminary Report on Patentability dated Mar. 31, 2016 for PCT/US2014/056835, 8 pages.

Final Office Action issued Nov. 7, 2016 for U.S. Appl. No. 14/493,236, 15 pages.

Non-Final Office Action for U.S. Appl. No. 14/493,229, dated Jan. 25, 2017, 12 pages.

* cited by examiner

WEB-BASED SINGLE SIGN-ON WITH FORM-FILL PROXY APPLICATION

CROSS-REFERENCE TO RELATED APPLICATIONS

This application claims priority to U.S. Provisional Patent Application No. 61/880,800, filed Sep. 20, 2013, entitled "SYSTEMS AND METHODS FOR WEB-BASED SINGLE SIGN-ON,", the disclosure of which is hereby incorporated in its entirety by reference for all purposes.

BACKGROUND

In an enterprise, users (e.g., employees) typically may have access to one or more different systems and applications. Each of these systems and applications may utilize different access control policies and require different credentials (e.g., user names and passwords). This may require a user to manage many different credentials for the systems and applications they regularly use, leading to password fatigue, wasted time entering and reentering credentials, and additional IT resources to recover and/or reset lost credentials. Single sign-on (SSO) can provide a user with access to multiple systems and applications after an initial log-in. For example, when the user logs-in to their work computer, the user can then also have access to one or more other systems and applications.

Previous SSO solutions were desktop-based, including a desktop client executing locally on the user's computer that allowed the user to manage their credentials and provide other SSO services and administration. This required a desktop or laptop computer to execute the client and access the user's systems and applications. The locally executing client could monitor the user's activity to provide single sign-on services. However, users increasingly access web-based services using smart phones and tablets that may not be able to execute a full desktop SSO client. Additionally, these previous SSO systems typically could provide single-on for systems that utilize the same access control type, but did not integrate applications that use different access control types. As a result, SSO may provide single sign-on for several of the user's applications, but the user may still be required to log-in manually to other systems or applications.

BRIEF SUMMARY

In accordance with an embodiment, web-based single sign-on can enable a user to log in to a single interface (such as through a web browser or thin client) and then provide SSO services to the user for one or more web applications, systems, and other services. The web-based SSO system can be extended to support one or more different access control methods, such as form-fill, Federated (OIF), SSO Protected (OAM), Privileged/Shared (OPAM), Oauth, and other policies. The web-based SSO system can include a user interface through which the user can access different web applications, systems, etc. and manage their credentials. Each SSO service can be associated with a web interface (such as a REST interface) that enables the SSO services to be accessed over the web using any web-enabled device, for example through a browser, without a fully featured client deployed to the user's device. The web interfaces can provide CRUD (create, read, update, delete) functionality for each SSO service. To support different access policy types, the web-based SSO system can include an extensible data manager that can manage data access to different types of repositories transparently.

In some embodiments, requests for web applications can be passed through an SSO proxy. When the SSO proxy receives a response from the web applications, the proxy can augment the response with policy information and other payload content, embed an SSO application that offloads SSO processing to the client device, and rewrite the content of the response as needed. The embedded application, which in some embodiments can be implemented as a Javascript application, takes advantage of the processing power of the client devices to execute the single sign-on functionality. For example, template matching, credential injection, and other SSO processing can be handled on the client side. In some embodiments, a user can access additional applications and perform additional SSO management through a web-based logon manager interface. By offloading much of the SSO processing to the client device, this solution can easily scale to accommodate many devices. Adding the SSO functionality to the web-based interface also improves the user experience.

In some embodiments, a method is provided comprising receiving, at a server, a request from a client device to access a web application. The method can further comprise passing the request to the web application and receiving a response from the web application. The method can further comprise augmenting the response with policy data and a single sign-on application to create an augmented response, and returning the augmented response to the client device.

In some embodiments, the single sign-on application can execute in a client browser and can be configured to: request a policy associated with the web application; match a page received from the web application to the policy; request credentials associated with a user to access the web application; inject the credentials into one or more fields on the page based on the policy; and submit the credentials to the web application. In some embodiments, the single sign-on application is a Javascript application.

In some embodiments, the method can further comprise receiving a request from the single sign-on application for a policy associated with the web application; sending a request to a data manager for the policy; and sending a response to the single sign-on application including the policy. In some embodiments, the method can further comprise receiving a request from the single sign-on application for a credential associated with a user to access the web application; sending a request to a data manager for the credential; and sending a response to the single sign-on application including the credential.

In some embodiments, the single sign-on application can be configured to identify a platform associated with the client device; and execute one or more platform specific operations. In some embodiments, the platform can include one or more of a client device type and a browser application type.

In some embodiments, a non-transitory computer readable storage medium can be provided, including instructions stored thereon which when executed by a processor cause the processor to perform the steps of: receiving a request to access a web application; passing the request to the web application; receiving a response from the web application; augmenting the response with policy data and a single sign-on application to create an augmented response; and returning the augmented response.

In some embodiments, a system can be provided comprising a computer, including a computer readable storage medium and processor. The system can further include a single sign-on proxy, executing on the computer, wherein the single sign-on proxy is configured to receive requests for web applications from clients and return augmented responses from the web applications to the clients. When a request to access a web application is received from a client, the single sign-on proxy is configured to pass the request to the web application, receive a response from the web application, augment the response with policy data and a single sign-on application to create an augmented response, and return the augmented response.

BRIEF DESCRIPTION OF THE DRAWINGS

Illustrative embodiments of the present invention are described in detail below with reference to the following drawing figures.

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive.

Systems depicted in some of the figures may be provided in various configurations. In some embodiments, the systems may be configured as a distributed system where one or more components of the system are distributed across one or more networks in a cloud computing system.

Embodiments of the present invention are directed to web-based single sign-on service that can enable a user to log in to a single interface (such as through a web browser or client application) and then provide single sign-on (SSO) services to the user for one or more web applications, enterprise systems, and other services. The web-based SSO system can be extended to support one or more different access control methods, such as form-fill, federated identity, policy-based controls, Privileged/Shared accounts, OAuth, and other security systems. The web-based SSO system can include a user interface through which the user can access different web applications, systems, etc. and manage their credentials. Each SSO service can be associated with a web interface (such as a REST interface) that enables the SSO services to be accessed over the web using any web-enabled device, for example through a browser, without a fully featured client deployed to the user's device. The web interfaces can provide CRUD (create, read, update, delete) functionality for each SSO service. To support different access policy types, the web-based SSO system can include an extensible data manager that can manage data access to different types of repositories transparently.

Figure 1:
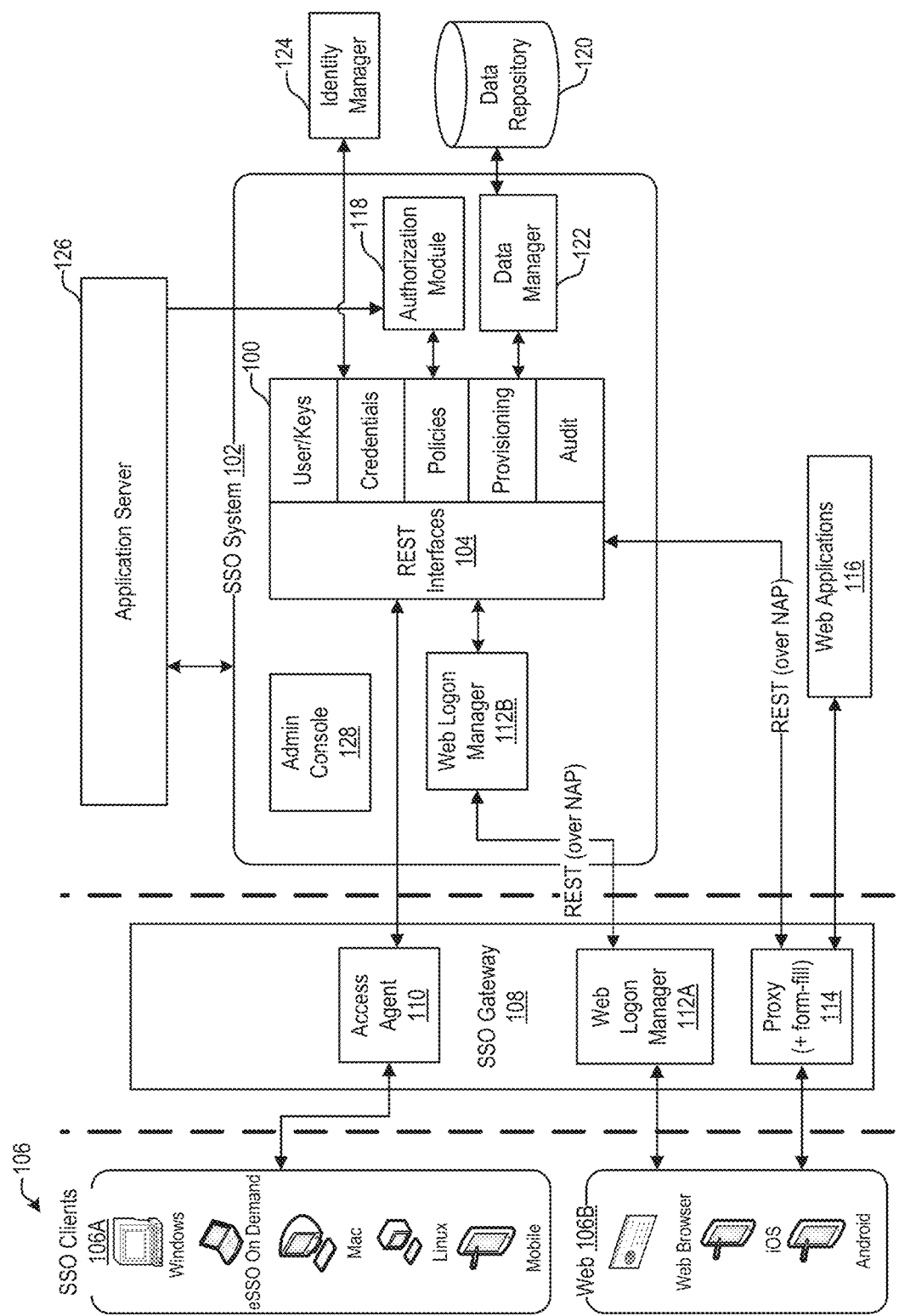
FIG. 1 illustrates an overview of a web-based single sign-on system, in accordance with an embodiment of the present invention.

FIG. 1 illustrates an overview of a web-based single sign-on system, in accordance with an embodiment of the present invention. As shown in FIG. 1, single sign-on services 100 can be implemented on an SSO server 102. SSO server 102 can use one or more customized web interfaces 104 to provide SSO services 100 to one or more different clients 106. In some embodiments, SSO server 102 can be integrated into an access manager server. This allows one or more different end user clients 106 to access and utilize SSO services from a single SSO backend. Clients 106 can include client devices on which an SSO client application 106A has been installed, these may be referred to as thick, or rich, clients, and can include personal computers, workstations, mobile devices, and other client devices. Additionally, or alternatively, SSO services can be managed and provided by a web application 106B or a browser application, such as a Javascript application, eliminating the need to separately provision and install a standalone SSO application on each client device. As used herein, SSO application can be used to refer to either the standalone SSO client application installed at a client device or the browser-based SSO application.

Each web interface 104 defines how the clients can access SSO services and resources including credentials (user names/passwords, link to a federated or protected site, or other type) and policies that define how the SSO services interact with applications using the credentials. In some embodiments, each SSO service 100 can be associated with a different web interface 104. In some embodiments, applications can be local or remote, including web applications such as SaaS or other cloud-based applications and/or services. Being web-based, the user can securely access their applications using any internet-connected device. Although REST (representational state transfer) interfaces are described herein, any web-based interfaces may be used.

In some embodiments, the SSO application can identify authentication events using predefined policies stored in SSO services 100. Through the web interfaces, end user credentials and policies can be managed and applied to requests received from clients 106. A user can logon at one of clients 106 by presenting a credential (Smartcard/Proximity card, token, PKI (public key infrastrcture), Windows Logon, LDAP (lightweight directory access protocol) logon, biometric device, etc.). The credential can then be analyzed by an authentication service. In some embodiments, one or more client-side authentication plugins can detect different authentication events and collect the credential received from the user. Each authentication plugin can be associated with a different type of credential and/or different logon method. In some embodiments, each authentication plugin can be associated with a grade. In some embodiments, grades can be assigned to types of credentials and types of requests. Grades can be stored as numerical values. This enables the SSO system to vary its response to a logon request depending on the grade of the credential provided by the user. For example, if a user logs-in with a credential associated with a grade of 1, when an authentication event is identified associated with a grade of 2 or higher, the user can be prompted to provide a higher grade credential. In some embodiments, authentication information can be stored as an authentication cookie within a user's browser application. The authentication cookie can obtained from a local or web based authentication service upon receipt of credentials from a user (e.g., when the user logs-in to their client device, through a web-based logon page, etc.). The authentication cookie can be included with web requests to SSO server 102 and can be verified prior to providing SSO services in response to the request. In some embodiments, different services may require different levels of authentication which may be embodied in different authentication cookies. If a user requests a service, but the user's authentication cookie does not authorize access to the service, the user can be redirected to a login page to obtain a new authentication cookie.

In some embodiments, requests from clients 106 can be received through a SSO Gateway 108, such as a load balancer or other web server. SSO Gateway 108 can implement one or more access agents 110 to balance requests from clients 106. In some embodiments, the user can access an SSO user interface 112A, referred to herein as a logon manager or dashboard, through a client 106 executing on their device or through a web browser. In some embodiments SSO user interface 112B can be implemented at SSO system 102. In some embodiments, the SSO user interface 108 can include a list of the applications the user commonly utilizes. The user can manage their credentials and policies associated with applications through the SSO user interface. When the user requests to access an application through the user interface, the SSO user interface can determine the policy type for the application and acquire the user's credential based on the policy type. In some embodiments, authorization module 118 can verify an authentication cookie included with the request to determine whether the user is authorized to retrieve the credential. If authorized, the user can be logged into the application using the credential. Various credentials and policies can be maintained in different repositories. When a request is received to access, retrieve, update, delete, or otherwise interact with a stored credential and/or policy, SSO services 100 can access the corresponding repository 120 through a data manager 122. In some embodiments, the SSO proxy 114 can enable the users to access web applications 116 using SSO services through a web browser directly, without first accessing the SSO user interface 110 or using a client executing on the user's device. In some embodiments, SSO services 100 can access an identity manager 124, such as a corporate directory, to verify a user's identity.

In some embodiments, the SSO services 100 can manage granting/denying access to applications, including automatic sign-on, application password change and reset, session management, application credential provisioning, as well as authentication inside and outside of a session. In some embodiments, SSO system 102 can provide automatic single sign-on functionality for Windows, Web, Java, and mainframe/terminal-based applications running or being accessed from client devices. Logon Manager 112A can monitor the session, automatically detecting logon requests from applications and completing the logon automatically according to the particular logon requirements associated with the requests.

In some embodiments, various applications and credential types can be supported, such as Oracle Access Management protected resources, federated applications/resources, and form-fill applications. For OAM protected resources, user requests can be authenticated and then directed to URLs associated with the requested resources. For Federated Applications, links to federated partners and resources can be provided, including business to business (B2B) partner applications and SaaS applications. For form fill applications, templates can be used to identify fields of application web pages through which credentials can be submitted.

As described above, web-based SSO services can be provided through various client applications, including multiple browser-based access methods. As discussed further below, a user can access applications, and receive SSO services, through an SSO gateway 108. One access method enables the user to access SSO services transparently through an embedded SSO application automatically installed in a user's browser. In some embodiments, a user can access a web logon manager using their browser to access applications, manage policies and credentials, and otherwise consume SSO services. These and other access methods are discussed further below.

Web-Based Single Sign-on with Form-Fill Proxy Application

In accordance with an embodiment, requests for web applications can be passed through an SSO proxy. When the SSO proxy receives a response from the web applications, the proxy can augment the response with policy information and other payload content, embed an SSO application that offloads SSO processing to the client device, and rewrite the content of the response as needed. The embedded application, which in some embodiments can be implemented as a Javascript application, takes advantage of the processing power of the client devices to execute the single sign-on functionality. By offloading much of the SSO processing to the client device, this solution can easily scale to accommodate many devices. Adding the SSO functionality to the web-based interface also improves the user experience.

Figure 2:
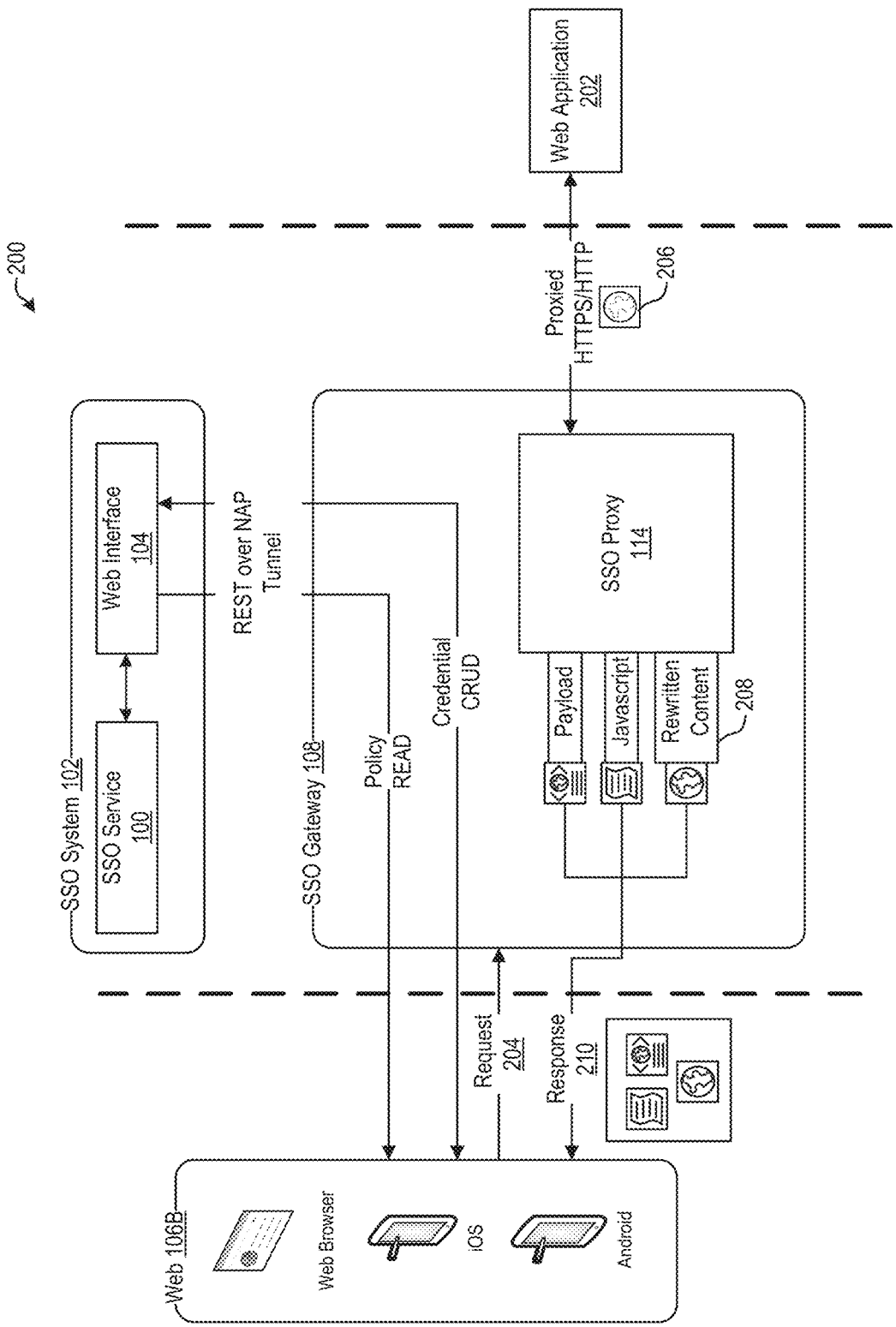
FIG. 2 illustrates a block diagram of a form fill architecture, in accordance with an embodiment of the present invention.

FIG. 2 illustrates a block diagram of a form fill architecture 200, in accordance with an embodiment of the present invention. As described above, the SSO system 102 can be accessed through an SSO gateway 108. The SSO gateway 108 can include a form-fill proxy that embeds an SSO application into a client's web browser application. In some embodiments, the SSO application can be a Javascript application that can communicate with SSO web services on access manager server 102 through a SSO Gateway 108 to manage credentials and obtain policies.

In accordance with an embodiment, the user can access a web application 202 through a web browser executing on a client device 106B. The web application 202 can be a web based email service, business application, or any other web application. Client device 106B can send a request 204 to access the web application 202 which is intercepted by a SSO Gateway 108. The SSO Gateway 108 can forward the request to the web application 202 and can intercept the response 206 from the web application. In some embodiments, the SSO Gateway 108 can modify the request such that any response from the web application 202 is returned to SSO Gateway 108. Before returning the response to the requesting client 106B, SSO Gateway 108 can pass the response 206 to an SSO proxy 114 at the SSO Gateway 108. SSO proxy 114 can modify the response to include additional data 208 that provides access to various SSO features.

For example, the proxy can add SSO application code, such as Javascript, to the response that enables SSO functions to be called and executed from the browser. The SSO application can execute at the user's device 106B to identify form-fillable pages and fields, request policies from the SSO server and manage credentials. As described further below, credential and policy requests can be sent through a web interface to SSO system 102. For example, a log-in page received from a web application can be detected by the SSO application. The SSO application can read a policy for web application and retrieve a credential. Using the credential, the SSO application can automatically fill the appropriate fields of the log-in page using the retrieved credentials and submit the log-in request. If the log-in fails, the SSO application can detect the log-in failure and execute a log-in failure flow that, e.g., enables the user to reset and/or recover their credential for the web application, and update their credential with the SSO server.

In accordance with an embodiment, the proxy can add additional content 208 to the response received from the web application. The additional content 208 can include templates and policies. The templates can be used by the SSO application to identify the form-fillable pages and fields and determine how to add the credentials to the fields. By adding the SSO application to the web page response, much of the SSO processing is offloaded from the backend system and onto the user device. By offloading much of the processing to the end user, processing demands are reduced at the SSO server resulting in a more scalable solution to SSO than previous systems.

Figure 3:
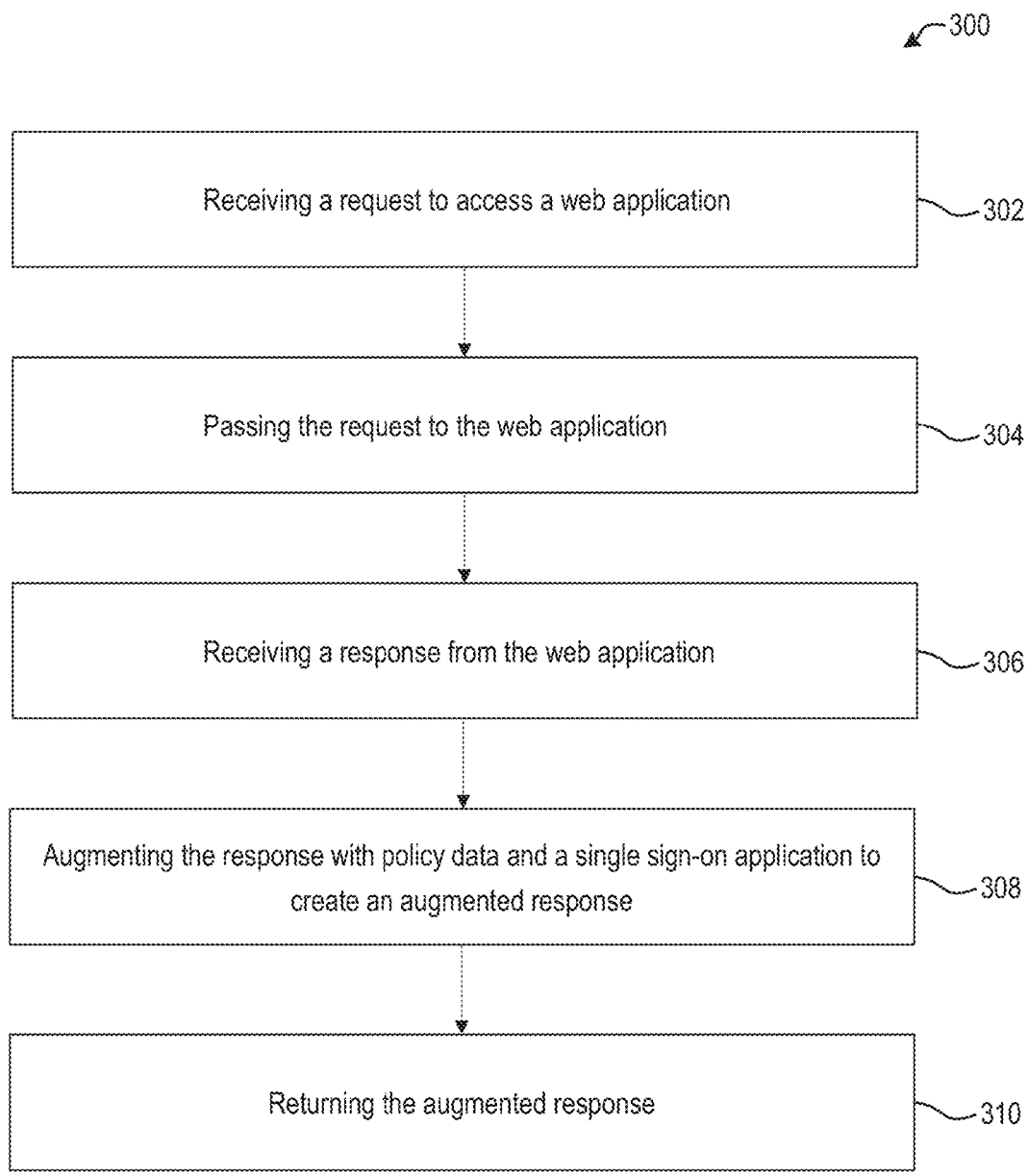
FIG. 3 depicts a block diagram of a method of injecting an SSO proxy application in response to a request to access a resource, in accordance with an embodiment of the present invention.

FIG. 3 depicts a block diagram of a method 300 of injecting an SSO proxy application in response to a request to access a resource, in accordance with an embodiment of the present invention. At block 302, a request can be received from a client device to access a web application. As described above, the request can be received at an SSO Gateway associated with an SSO system. In some embodiments, a request from a client device can be a request for a web page associated with a web application (e.g., an HTTP request). The request can be received from a client device that does not include an SSO client executing on the device.

At block 304, the request can be passed to the web application. In some embodiments, the SSO gateway can log information related to the request (time, date, web address, etc.) for later auditing or other purposes. At block 306, a response from the web application is received. The response can be a web page that includes fields for the user to supply log in information. At block 308, the response can be augmented to include policy data and a single sign-on application to create an augmented response. In some embodiments, the response can be rewritten to provide a similar look and feel of the user's enterprise system. For example, the color scheme and layout of the web page in response to the user's request can be modified to appear similar to the color scheme and layout of the user's internal intranet. At block 310, the augmented response is returned to the client device.

In some embodiments, the single sign-on application is a Javascript application. The single sign-on application can execute in the user's browser application and provide SSO services. For example, the SSO application can request policies and templates from the SSO system and use the policies and templates to match a page received in response to a request for a web application to a corresponding policy. The SSO application can automatically inject the appropriate user credentials into matching fields of the web page response and submit the credentials to the web application. This way, single sign on is effected without requiring a separate SSO client application to be provisioned and installed on a user's client device.

In some embodiments, the single sign-on application can include executable scripts associated with different hardware, operating systems, browsers, or combinations thereof. The SSO application can be configured to identify a platform associated with the client device, and to configure itself to execute one or more platform specific operations. The platform can refer to one or more of a client device type (desktop, mobile device, workstation, or other hardware configuration), a browser application type, and/or an operating system.

Figure 4:
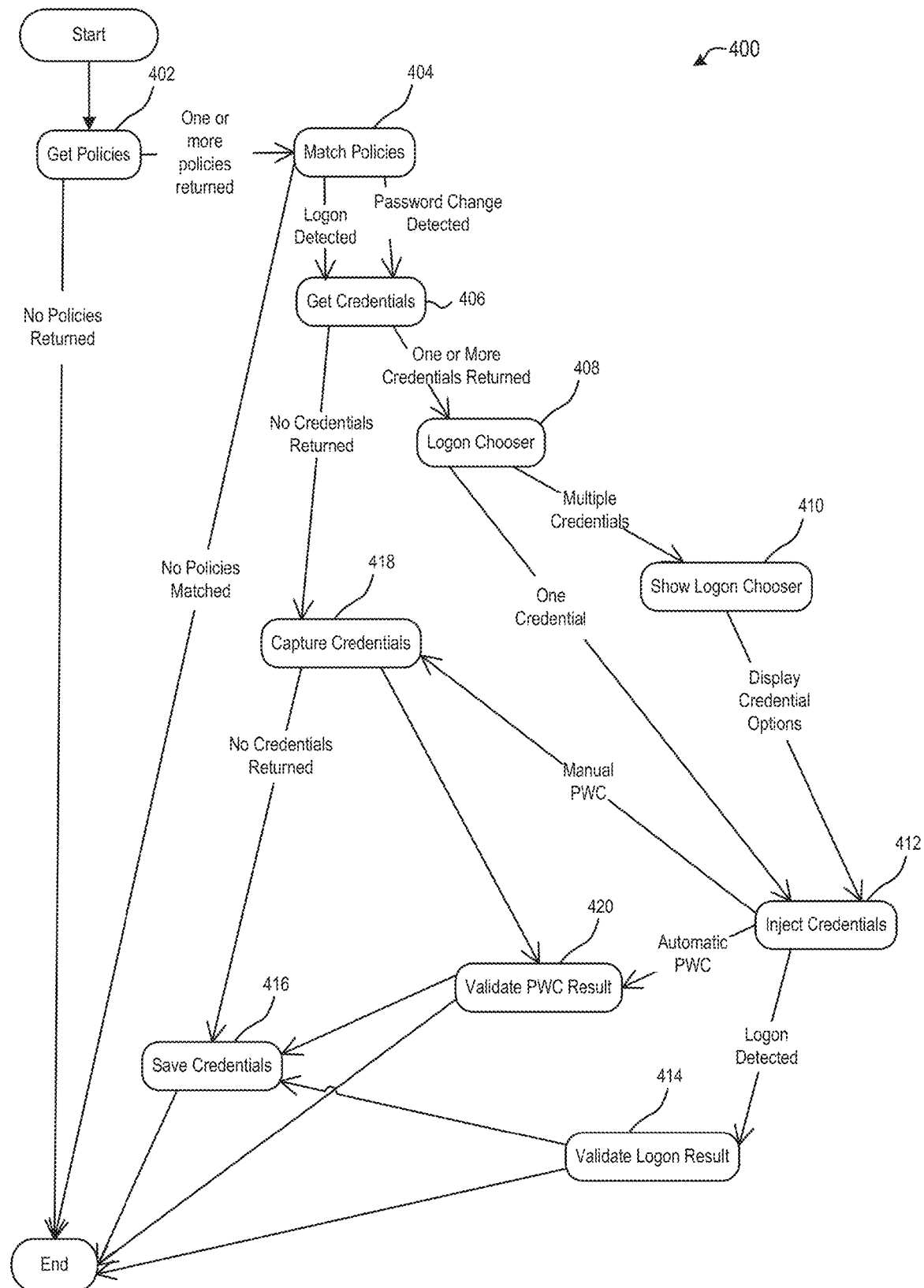
FIG. 4 depicts a form fill state diagram, in accordance with an embodiment of the present invention.

Once installed, the SSO application can provide SSO services to the user through the user's browser, without the need for a separate SSO client application. FIG. 4 depicts an SSO application state diagram, in accordance with an embodiment of the present invention. As shown in FIG. 4, at block 402, the SSO application executing in the user's browser can request policies associated with a web application. The request can be a web request formatted according to a web interface provided by an SSO system. If no policies are returned, execution of the SSO application can end and the web application can be opened in the user's browser without providing any additional SSO services (e.g., where no policies are found for the web application, the SSO application does not add credentials or log-in the user to the web application).

If at least one policy is returned then at block 404 the SSO application can match the policies to the page returned by the web application. For example, one policy can correspond to a log-in page, while a different policy can correspond to a password change page. Each policy can be associated with a page template. When an incoming page is matched to a policy, the incoming page is compared to the stored template pages. For example, the template may define various fields and types present in a given page, the locations of identifying content, labels, tags, etc. When an incoming page matches a given template, the policy corresponding to that template can be used to provide SSO services for that page. In some embodiments, the policy can define what actions are to be taken for a matched page (e.g., which credentials are to be supplied, how the credentials are to be supplied, etc.). If no policy is matched, indicating that there is no template matching the incoming page, then the incoming page can be presented to the user without any further SSO services being provided.

Once a policy has been matched, at block 406, the SSO application can request credentials from the SSO server. If one or more credentials are returned, then at block 408 the SSO application can invoke a logon chooser. In some embodiments, at block 410 the logon chooser can be displayed to the user on the user's client device, allowing the user to manually select from the returned credentials. Once the user has selected credentials using the logon chooser, the SSO application, at block 412, can inject the selected credentials and submit the logon request.

In some embodiments, once the user has made a selection, the selected credentials are submitted and at 414 the SSO application can validate the logon result. If the logon is successfully performed, at block 416 the SSO application can send a request to the SSO server to update the user's credentials for that page based on the user's selection. As such, when the user requests that web application later, the selected user credentials can be returned without requiring the user to manually select the credentials from the logon chooser. In some embodiments, an automated logon chooser process can be executed prior to displaying the logon chooser to the user. For example, if a small number of credentials are returned, the SSO application can automatically submit each returned credential in turn until a successful logon is detected. The SSO application can then send an update request to the SSO server to update the user's credentials for that web application.

If only one credential was returned, processing can bypass block 410 and go to block 412 where the credential can be injected into the page and submitted without further input from the user. Once the credentials have been submitted, the SSO application can monitor the status of the login request. In some embodiments, if the login fails processing can end. In some embodiments, if the login succeeds, at block 416 the credentials can be saved.

If no credentials are returned, the incoming page can be displayed to the user in the user's browser and, at block 418, the SSO application can capture the credentials entered by the user manually. The credential entered by the user can be submitted and the logon results can be monitored. If logon was successful, at block 416 the credential is saved and the user is logged into the web application. If the logon fails, the web application's logon failure page can be displayed to the user. In some embodiments, the SSO application can automatically detect the logon failure page, match a policy to the logon failure page and execute a flow corresponding to logon failure (such as password recovery or reset).

In some embodiments, the user can elect to perform a password change (PWC) at the web application. The SSO application can detect a PWC page (e.g., using a PWC template defined for that web application), and at block 418 can capture the credentials provided by the user. The SSO application can monitor the PWC process and, if successful, at block 416 the new credential can be saved to the SSO server. If the PWC is unsuccessful, the web application's PWC failure page can be displayed to the user. In some embodiments, the SSO application can automatically detect the PWC failure page, match a policy to the PWC failure page and execute a flow corresponding to PWC failure (such re-executing the PWC flow and indicating to the user the reason for the failure).

As shown in FIG. 4, processing at blocks 402, 406, 410, and 416 (e.g., getting policies and credentials, saving credentials, and getting user settings for a logon chooser) involve communicating with the SSO server. However, the other processing steps, including monitoring the success of PWC and logon attempts, policy and template detection, credential injection, etc., can be performed by the SSO application in the browser. This reduces the amount of processing resources required by the SSO server and makes it easier to add additional users without straining system resources.

In some embodiments, the SSO server can receive a request from the single sign-on application for a policy associated with a web application. The SSO server can then send a request to a data manager for the requested policy. If one or more policies are returned, then the SSO server can send a response to the single sign-on application including the one or more policies. If no policies are returned, the SSO server can return a response to the SSO application indicating that no policies are associated with the web application.

In some embodiments, the SSO server can receive a request from the single sign-on application for a credential associated with a user to access a web application. The SSO server can then send a request to a data manager for the credential. If one or more credentials are returned, then the SSO server can send a response to the single sign-on application including the one or more credentials. The SSO application can then present a logon chooser to the user to select from the one or more credentials. If no credentials are returned, the SSO server can return a response to the SSO application indicating that no credentials are associated with the user and the web application.

In some embodiments, the SSO application can include a credential manager that can search and list credentials, perform auto and manual password change (PWC) processing, logon chooser, and logon Failure. As described above, in some embodiments, the SSO application can be installed in a user's browser in response to a request for a web application (e.g., the SSO application can be added to the augmented response that is sent to the user. As such, the SSO application can be initialized into a state corresponding to the incoming response web page that includes the SSO application.

In some embodiments, a web application request can be initiated from a web logon manager (WLM), as described further below. In such an embodiment, the SSO application can obtain credential information from the WLM (e.g., by checking a query string, session storage information, or other information). Using the credential from WLM enables the SSO application to avoid requesting credential information from the SSO server, further reducing the load placed on the SSO server.

In some embodiments, an automatic password change (PWC) process can be implemented by the SSO system. The SSO system can match a PWC page to a template, enabling the SSO system to identify a policy associated with the PWC page. The SSO application can send a request for credentials that match the page template. Using the credential, the current user name and password can be added to the appropriate fields in the PWC page. During automatic PWC, a new password can be automatically generated by the SSO server and the user's credential can be updated with the new, automatically generated password. The SSO server can then return the updated credential to the SSO application. The SSO application can add the new password to the appropriate field of the PWC page and submit the password change request. At block 420 the PWC result can be validated. If the password was successfully updated, at block 416 the change is confirmed and the updated credential is saved. If the password was not successfully updated, the user can be returned to the PWC page.

In some embodiments, a manual PWC process may also be provided. During manual PWC, the PWC page is matched as in the automatic PWC and credentials are identified based on the match. The SSO application can receive the credentials and inject the credentials into the appropriate fields in the PWC page. For manual PWC, the policy can disable auto-submit, preventing the SSO application from automatically submitting the credentials. The SSO application can then monitor the PWC page to capture the new password credential entered manually by the user. The password provided by the user can then be used to update the stored credential. In some embodiments, the SSO server can confirm that the password provided by the user meets password standards (either those set by the web application or by the SSO server), such as number of characters, types of characters, etc.

Figure 5:
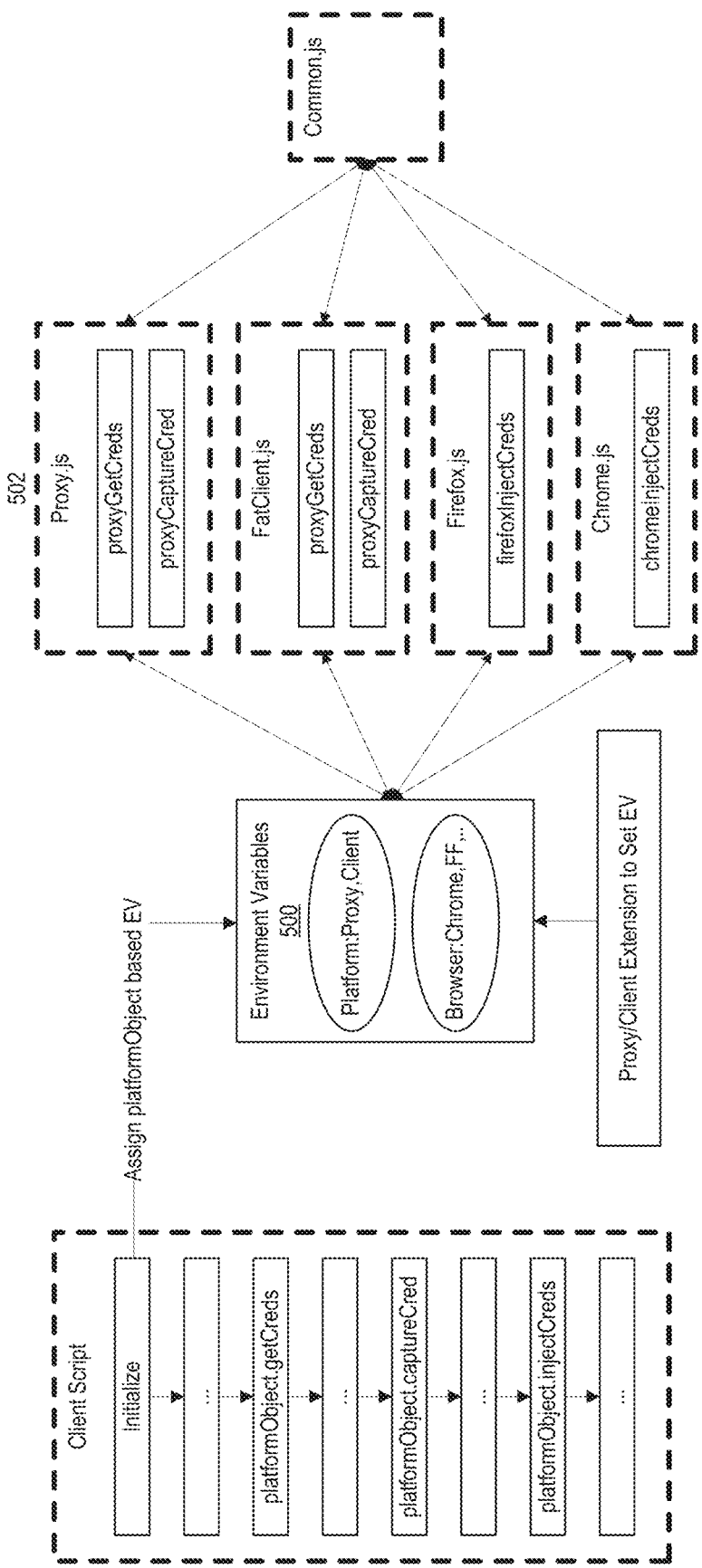
FIG. 5 illustrates a pluggable single sign-on application operable to execute in different environments, in accordance with an embodiment of the present invention.

FIG. 5 illustrates a pluggable single sign-on application operable to execute in different environments, in accordance with an embodiment of the present invention. As described above, the proxy augments responses from web applications to include an SSO application that executes in the user's browser and can communicate with the SSO server to provide SSO services, such as policy and credential management. Since each user device, client, and browser can have different requirements and capabilities, the SSO application can be pluggable to support different environments. For example, environmental variables 500 can be set to define the client (e.g., is it a standalone client or a browser) and the browser in use (such as Internet Explorer, Chrome, Firefox, etc.). Each supported client can be associated with browser-specific and platform-specific functions 502. Support for new platforms and browsers can be added by creating a platform- or browser-specific plugin for the SSO application.

The SSO application can be configured upon installation or a platform specific SSO application can be provided by the SSO server. In some embodiments, once installed the SSO application can call platform specific functions to perform SSO services. In some embodiments, a set of shared functions may be provided across multiple platforms in addition to the platform specific functions. For example, functions that are called to communicate with the SSO server can be shared across multiple platforms, while platform specific functions for injecting and capturing credentials from a web page may also be provided.

As described above, an SSO application can be installed in a user's browser application and provide SSO services to the user transparently. Additionally, the SSO application can take advantage of the processing capabilities of the user's client device to reduce the amount of processing required by the SSO server 102. For example, template matching, credential injection, and other SSO processing can be handled on the client side. In some embodiments, a user can access additional applications and perform additional SSO management through a web-based logon manager interface.

Web-Based Single Sign-on Logon Manager

Existing logon managers typically can only coordinate access to applications that use the same login method. For example, form-fill applications cannot be managed with other applications that use a different login method. Embodiments of the present invention provide an end user application dashboard which provides a central location through which the end user can access their applications. The dashboard provides a unified launch point for multiple applications having different log-in requirements. For example, form-fill applications, federated applications, and other access controlled and unprotected applications. Applications can register with the dashboard and specify how the application is accessed. Policies can be defined for the applications after registration based on how the applications are accessed. The dashboard is extensible such that new login types can be supported. The dashboard provides a simple, unified access point for all of a user's applications regardless of how the applications are accessed.

Figure 6:
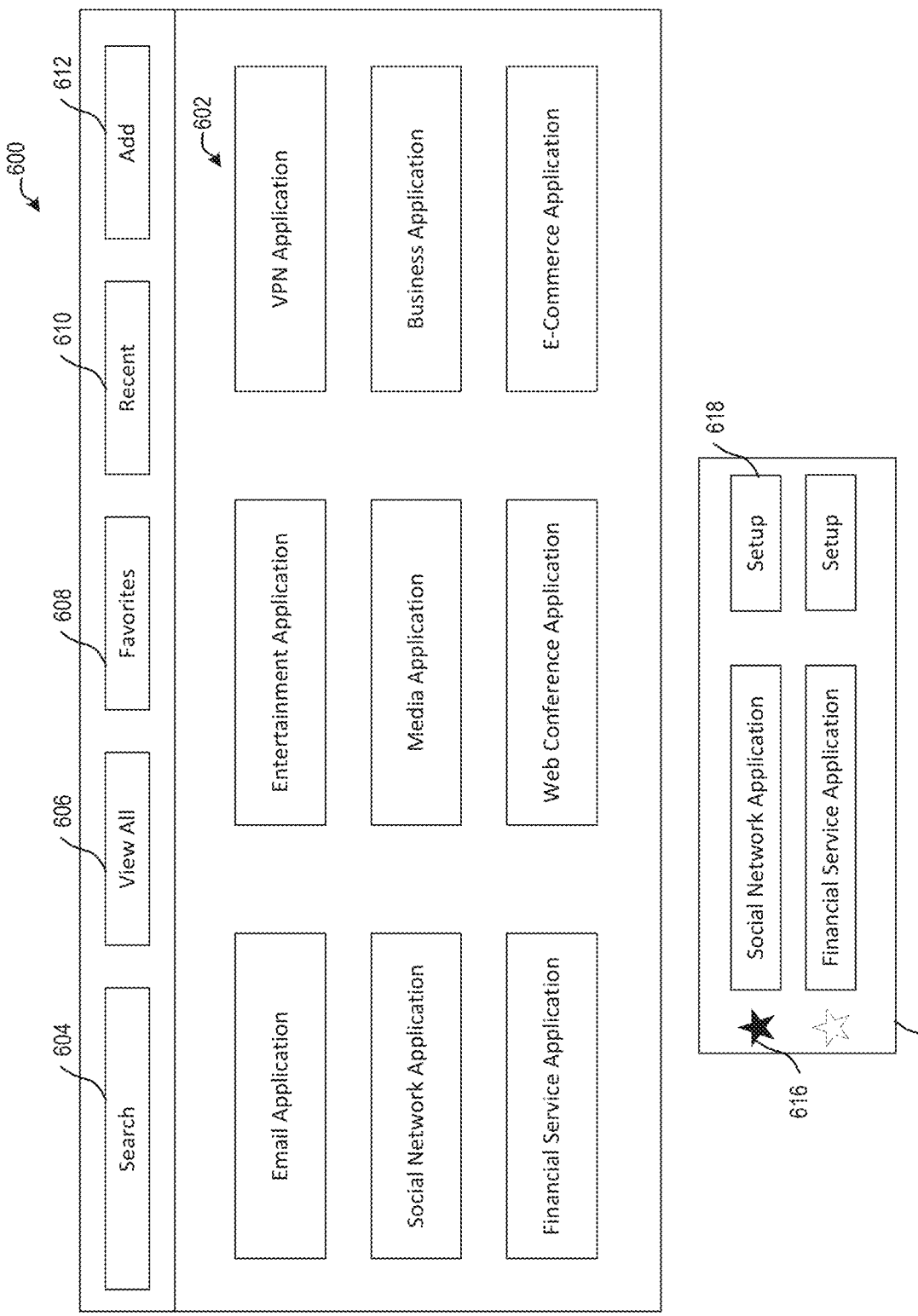
FIG. 6 illustrates a desktop logon manager interface, in accordance with an embodiment of the present invention.

FIG. 6 illustrates a desktop logon manager interface, in accordance with an embodiment of the present invention. As shown in FIG. 6, the logon manager interface 600 can provide a unified view of one or more application icons 602, each representing web applications, services, and or systems that a user can access. The user's application icons can be displayed in an end user application catalog, or dashboard, and each application can be associated with different access requirements. The dashboard can be displayed after the user logs into the system. In some embodiments, the user can logon to their client device to access the web logon manager. In some embodiments, the user can first login upon accessing the web logon manager. Some applications displayed in the dashboard may be unprotected and require no credential to access, while others may be form fill applications, federated applications, or other access types. As such, the dashboard can display applications regardless of access type, presenting a unified view of applications and a single point of access to the user.

Each application icon shown in the dashboard can be associated with one or more policies and one or more credentials. A policy defines how an application can be accessed, and the credential provides information that can be used to authenticate the user to access the application. In some embodiments, the user's dashboard can be provisioned. For example, a new employee at a company can have a dashboard setup with several application icons the employee will be utilizing, such as icons for an email application and business applications. Once the applications are setup and visible in the user's dashboard, the policy type/type of credential for each application is hidden from the user. The user can simply select an application and access it, without having to manage the details of accessing a particular application.

In some embodiments, the web logon manager can display different views of the applications available to the user, enabling the user to customize the layout of their dashboard, such as by changing which applications are shown in the dashboard and how the applications are organized. For example, the web logon manager can provide a search function 604, enabling the user to search for particular applications (e.g., by name, type, or other characteristic) and the web logon manager can then display a search view that includes matching applications. In some embodiments, the user can select a view all 606 icon to have all available applications displayed in the dashboard. The user can also select to sort the applications along different dimensions (e.g., most frequently accessed, time added, alphabetical, etc.). In some embodiments, the user can designate particular applications as favorites, and select a favorites icon 608 to view only those applications that have been so designated. In some embodiments, the user can view recently added applications by selecting recent icon 610.

In some embodiments, the user can manually add 612 new applications to the web logon manager. For example, the user can add and remove applications by adding or deleting corresponding policies and credentials. In some embodiments, the user can update their credentials through the logon manager. In some embodiments, an edit view 614 can be displayed that allows the user to designate favorites 616 and configure each application. For example, the user can select setup 618 to manually update settings related to an application (e.g., update credentials or policies). From the dashboard, a user can launch an application by selecting (e.g., clicking or tapping) on the application name.

In some embodiments, a user can add applications to their dashboard by selecting an available application from a catalog and providing appropriate credentials. The available applications can each use different types of credentials. Depending on the application selected, the web logon manager can determine the type of credential used by the selected application, and display a message to the user requesting the appropriate credential. In some embodiments, the user can provide a custom display name, description, or other details for an application. In some embodiments, display names can be pre-populated for the user. The user has the option to modify them as needed. In some embodiments, multiple credentials can be provided for the same web application (e.g., corresponding to multiple accounts with an e-commerce application). Each can be represented by its own application icon in the dashboard, and can be automatically named with an additional number or other indicator to differentiate between each credential. In some embodiments, additionally or alternatively, multiple logon credentials can be set up for an application. For example the logon manager can monitor user activity at a web application and capture additional credentials provided by the user.

In some embodiments, a user can remove credentials associated with a given application. Once credentials have been removed, the application can be automatically removed from the user's dashboard. In some embodiments, if the user has designated the application as a favorite, the application may still be displayed in a favorite view of the user's dashboard. The user can later add a new credential for the application and return the application to the user's dashboard. In some embodiments, if multiple credentials have been stored for a given application, the user can remove each credential separately. In some embodiments, the user can request that all credentials associated with a given application are removed.

In some embodiments, a user can share or delegate their credentials to another user. The dashboard can display a "share" icon for those applications that may be shared. Application developers and/or administrators can configure the applications for sharing. In some embodiments, sharing can be disabled on a per application basis. When a user elects to share their credentials, a prompt can be displayed requesting the user to provide user information for the user with whom the credentials will be shared. In some embodiments, the prompt can include a list of users (e.g., populated from an enterprise user database). When credentials have been delegated, the delagee may be prevented from sharing the credentials with additional users. In some embodiments, the number of users with whom credentials may be shared can be limited to a maximum number.

A user can revoke delegation at any given time by selecting a "revoke" icon. The revoke icon may be shown when the credentials are shared with another user. In some embodiments, when a user delegates credentials, the user can set a delegation time period after which the credentials are automatically revoked.

In some embodiments, the web logon manager can include a password change (PWC) wizard. As described above, the PWC wizard can include a manual mode in which the user specifies the new password and an automatic mode in which the PWC wizard automatically selects a new password on the user's behalf.

Figure 7:
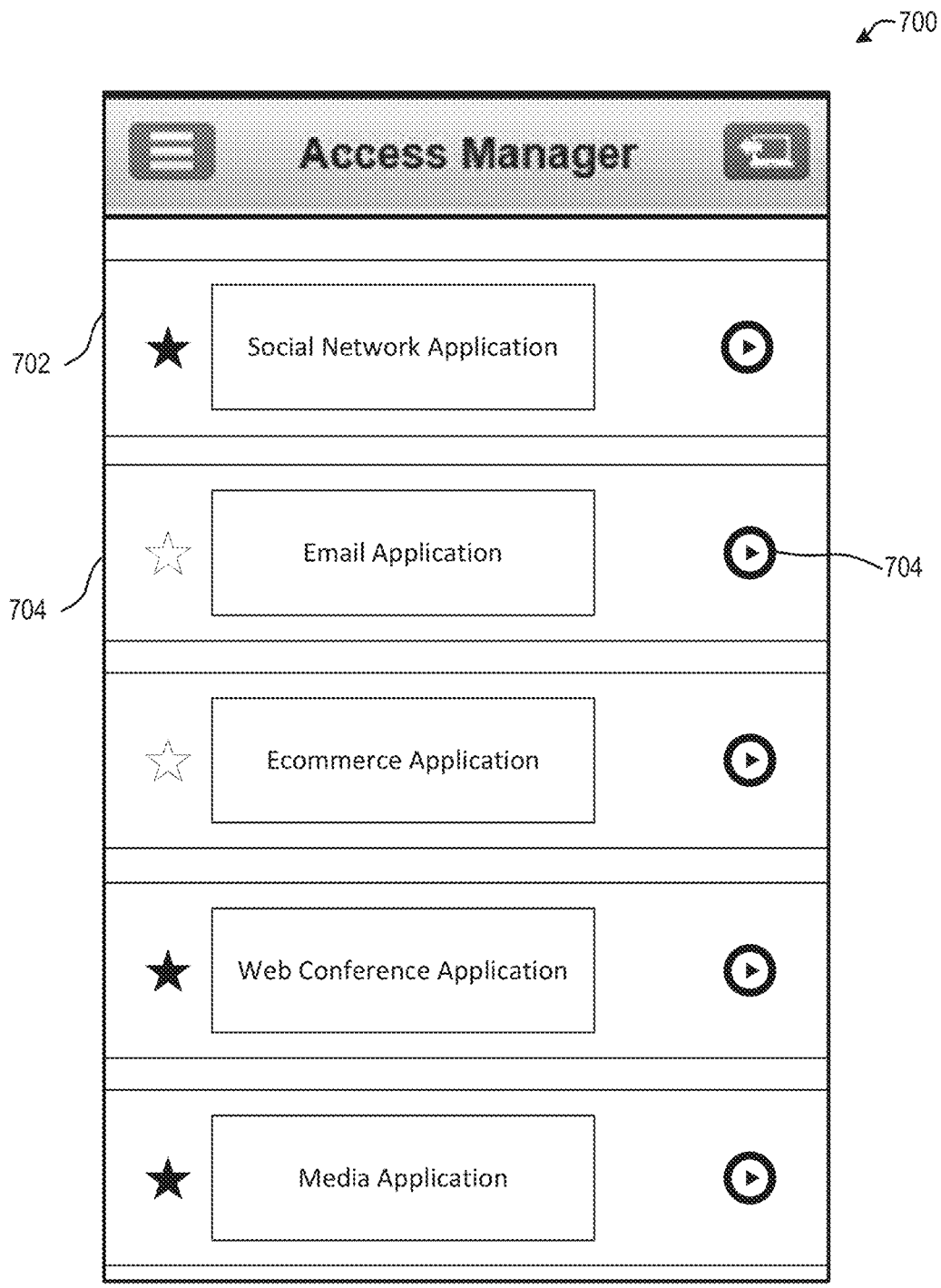
FIG. 7 illustrates a mobile logon manager interface, in accordance with an embodiment of the present invention.

FIG. 7 illustrates a logon manager interface 700, in accordance with an embodiment of the present invention. When a user accesses the logon manager from a mobile device, such as a smart phone or a tablet, the interface can automatically adapt to the size and dimensional requirements of the user's device. The mobile logon manager interface 700 can provide similar features to a full screen or desktop interface as described above with respect to FIG. 6. Each application icon, such as icons 702 and 704, can be resized and displayed in a scrollable list. The user can select an icon 704 next to the display name of an application to view the details of the application. In some embodiments, when in detail view, the user can be presented with the option to edit the application (e.g., by updating credentials and/or policies associated with the application). In some embodiments, icon 704 can launch the application when selected.

Figure 8:
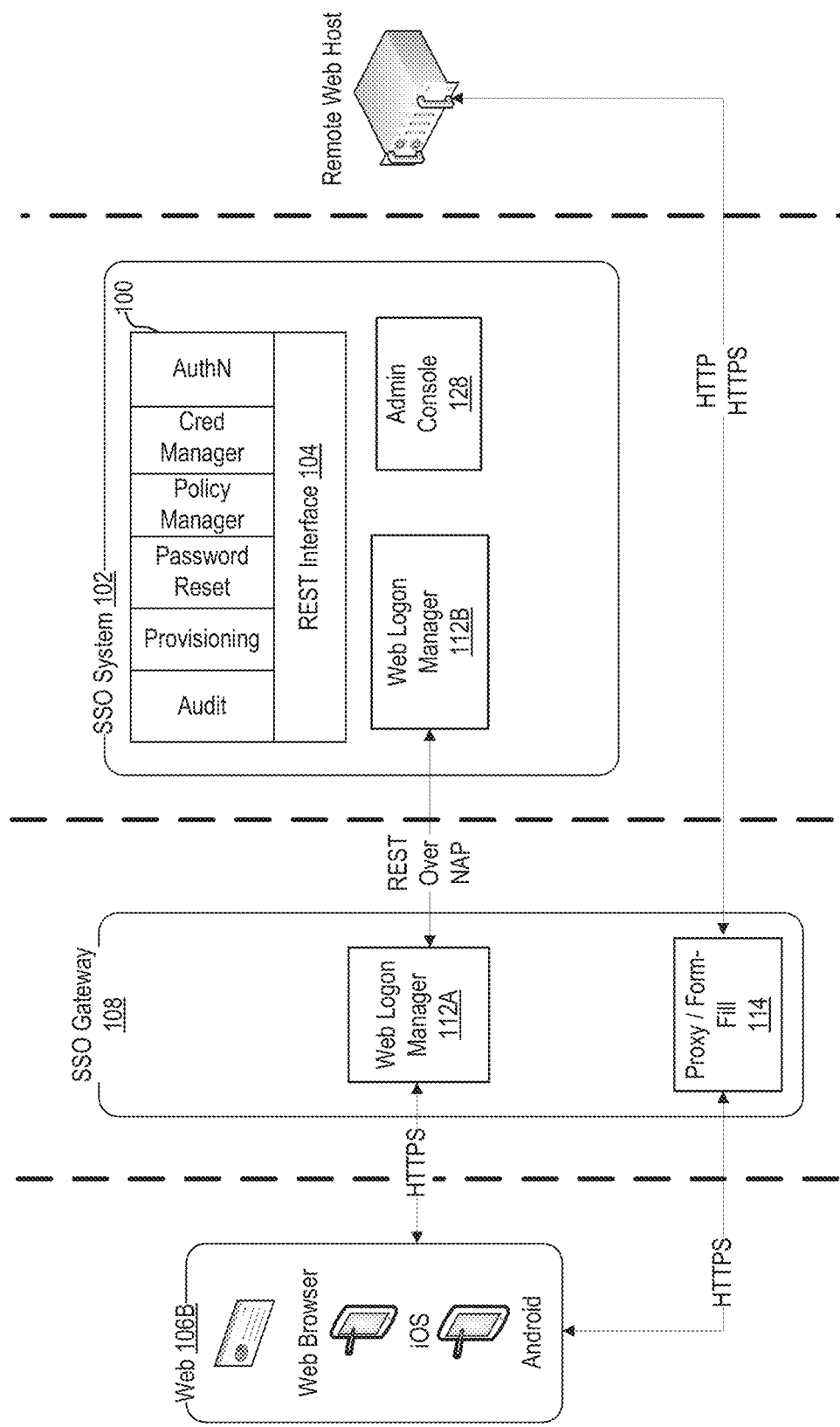
FIG. 8 illustrates a logon manager architecture, in accordance with an embodiment of the present invention.

FIG. 8 illustrates a logon manager architecture, in accordance with an embodiment of the present invention. Each icon shown in FIGS. 6 and 7 can represent a different application, such as web applications, local applications and remote applications. As described above, each icon can be associated with a policy that defines how the SSO system interacts with the application, and a credential that provides the user with access to the application. As shown in FIG. 8, a user can access the logon manager through an SSO client 106 executing on the user's device 106B. In some embodiments, the client can be a standalone client or a browser-based client.

In some embodiments, a user can access the logon manager through a browser on a client device by visiting a URL associated with the web logon manager. In some embodiments, the web logon manager can be distributed across SSO Gateway 108 and SSO system 102. A front end web logon component 112A can execute on SSO Gateway 108 and can provide a graphical user interface (GUI) through which requests from clients 106 can be received. In some embodiments, the user can be prompted to provide the credential (e.g., a user name and password) directly to the logon manager, or redirected and prompted to logon with the SSO system 102. Once logged on, a cookie or other identifier can be added to the user's browser indicating that the user is logged-in and can access the logon manager and view their dashboard. In some embodiments, when a user logs-in to their device, such as a tablet, laptop, or smartphone, the user can then access the logon manager without providing an additional credential. Once logged-in, the user can request access to applications shown on their dashboard without further log-in requirements.

In some embodiments, the web logon manager 112A can receive a request to access an application in the dashboard, for example when the user selects an application shown in the dashboard. Requests can be received at the front end web logon component 112A over HTTP/HTTPS and can be converted by front end web logon component 112A to an access protocol (such as Oracle Access Protocol, available from Oracle International Corporation, Redwood Shores, Calif.) and can be forwarded to back end web logon component 112B. The converted request can include a request, formatted for a web interface, for a policy associated with the application and/or for a credential associated with the user. Back end web logon component 112B can extract the policy and/or credential requests and send them to the SSO services 100 through web interface 104. The policies and/or credentials can be returned to back end web logon component 112B through web interface 104. Web logon component 112B can generate a response message including the policies and/or credentials and send the message over the access protocol to web logon component 112A. The web logon manager 112A can launch the application, for example by sending an HTTP request for a URL associated with the application. Using the policy(s) associated with the application, the web logon manager 112A can match a policy to a response received from the application. The web logon manager 112A can automatically provide the user credentials to the application according to the policy(s).

Figure 9:
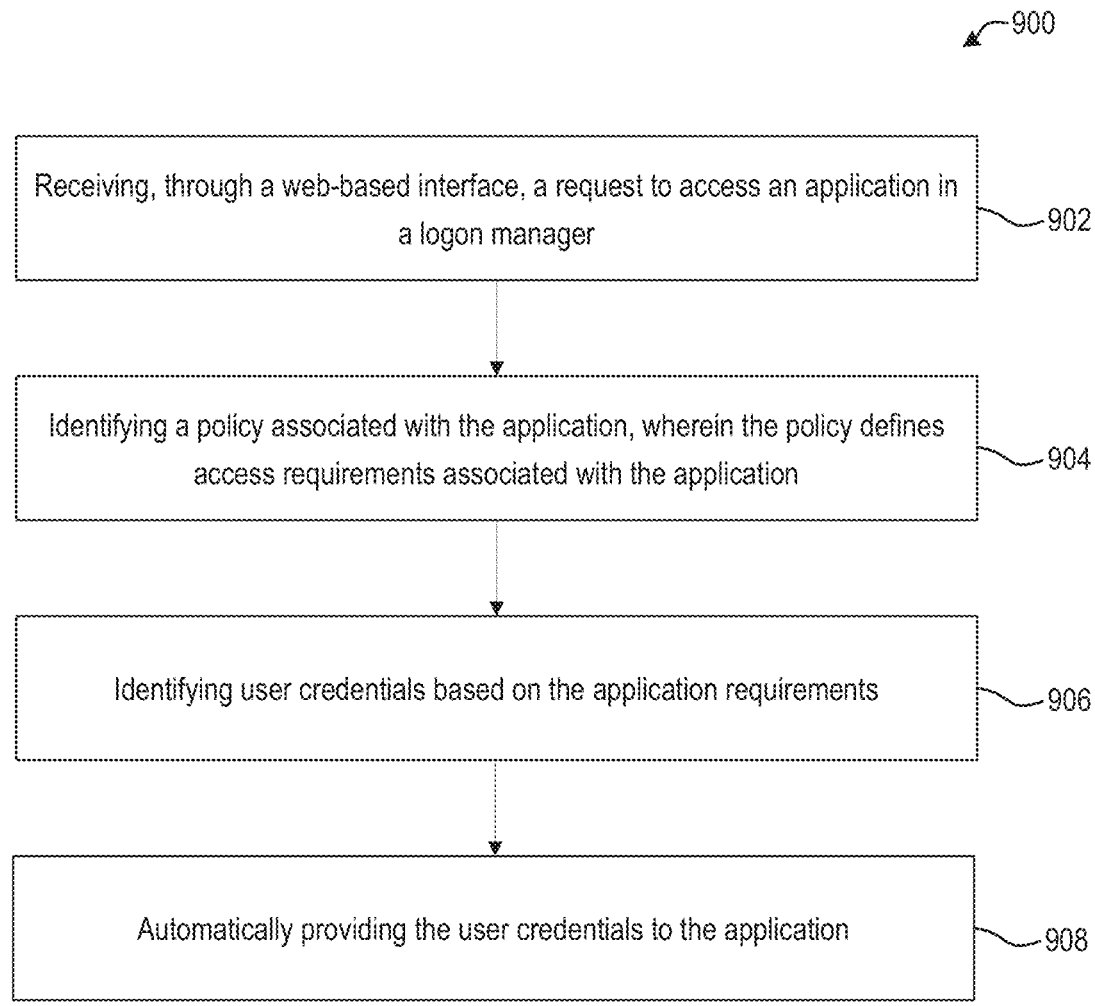
FIG. 9 depicts a block diagram of a method of accessing a web application through a web logon interface, in accordance with an embodiment of the present invention.

FIG. 9 depicts a block diagram of a method 900 of accessing a web application through a web logon interface, in accordance with an embodiment of the present invention. At block 902, a request to access an application can be received through a web logon manager user interface. In some embodiments, the request can be received over a web-based interface through a browser application executing on a user's client device (such as a desktop or mobile computing device). In some embodiments, the user can navigate to the web logon manager user interface by entering a URL corresponding to the web logon manager user interface in the browser application. In some embodiments, the user can automatically be redirected to the web logon manager user interface upon sending a request for a web page or web application through the browser application. The web logon manager user interface can request credentials from the user to access the user interface.

At block 904, a policy associated with the application can be identified. The policy can define access requirements associated with the application. For example, the policy can define a type of credential required to access the application and can define how the credential is to be provided to the application (e.g., which fields should receive the credentials). In some embodiments, the policy can be identified by the web logon manager by generating a policy request message and sending the policy request message to an SSO system through a web interface. At block 906, user credentials can be identified based on the application requirements. In some embodiments, the web logon manager can identify the credential based on the received policy. The web logon manager can retrieve the credential by generating a credential request message and sending the credential request message to an SSO system through a web interface.

At block 908, once the appropriate policy and credential have been received, the web logon manager can automatically provide the user credentials to the application. In some embodiments, when an incoming web page response is received from the application, the web logon manager can use the policy to identify fields of the web page response to inject the credential and submit the credential to the web application. In some embodiments, when the web logon manager receives a form fill policy in response to a policy request, the web logon manager can automatically populate fields in a graphical user interface associated with the application with the user credentials and submit the user credentials to the application through the graphical user interface. Upon logon, the web logon manager can verify that the logon was successful, and return the response web page to the user.

In some embodiments, a user or administrator can add a new application to the logon manager. For example, when a new employee is hired, a number of company-standard and commonly used applications can be provisioned to the new employee's dashboard. Adding a new application can include receiving a request to add a new application to the logon manager, the request can include a policy and a credential for the user. The web logon manager can send a request, through a web interface, to a data manager to store the policy and the credential. Once the data manager confirms that the policy and credential have been successfully stored, the logon manager can add an application icon corresponding to the new application to the logon manager, such that the icon is displayed in the logon manager. In some embodiments, multiple applications can be added at once, in a batch. Such a request can include receiving a request to provision multiple applications for a user, including policies and credentials for each of the applications. The web logon manager can then send multiple requests (or a single batch request) to the data manager to store the policy and credential for each application. Once confirmation is received of successful storage, the web logon manager can add icons corresponding to each of the plurality of applications to the logon manager, such that the icons are displayed when the user logs-in to the logon manager.

In some embodiments, the logon manager interface presents a unified view of applications associated with different types of credentials. For example, each application icon shown in the user's dashboard can be displayed together in aggregate. Once a given application icon is selected to launch the corresponding application, the web logon manager can communicate with the SSO system to launch the application using the appropriate credentials. In some embodiments, the user's dashboard can be sorted to display applications based on the credential type, or display multiple views where a given view shows applications associated with one credential type.

As described above, SSO services can be accessed by, and provided to, users through various channels (e.g., through an SSO application installed in a user's browser, through a web logon manager, or through other channels). Requests can be communicated to the SSO server 102 through one or more web interfaces which provide a standard, client agnostic, way of providing SSO services.

Web-Based Single Sign-on Services and Access Management

In accordance with an embodiment, single sign-on services, including credential management and policy management, can be integrated with a web-based or cloud-based SSO system through one or more web interfaces. Each SSO service provided by the SSO system can be accessed by a client through the web via the one or more web interfaces, such as a REST interface. Traditionally, SSO services were provided locally (e.g., through an SSO service executing on a local machine or a local network) and were configured to communicate using protocols that provided secure transfer of policy and credential information. However, to access these same services from a remote web-based or cloud-based SSO system, while maintaining backwards compatibility, presents a complex communications challenge. Clients are typically configured to send web requests and receive web responses over HTTP or HTTPS, whereas SSO service requests and responses typically use an access protocol (such as network access protocol or Oracle access protocol). Embodiments of the present invention facilitate tunneling of requests and responses can be tunneled over NAP from the client to the access manager server.

Figure 10:
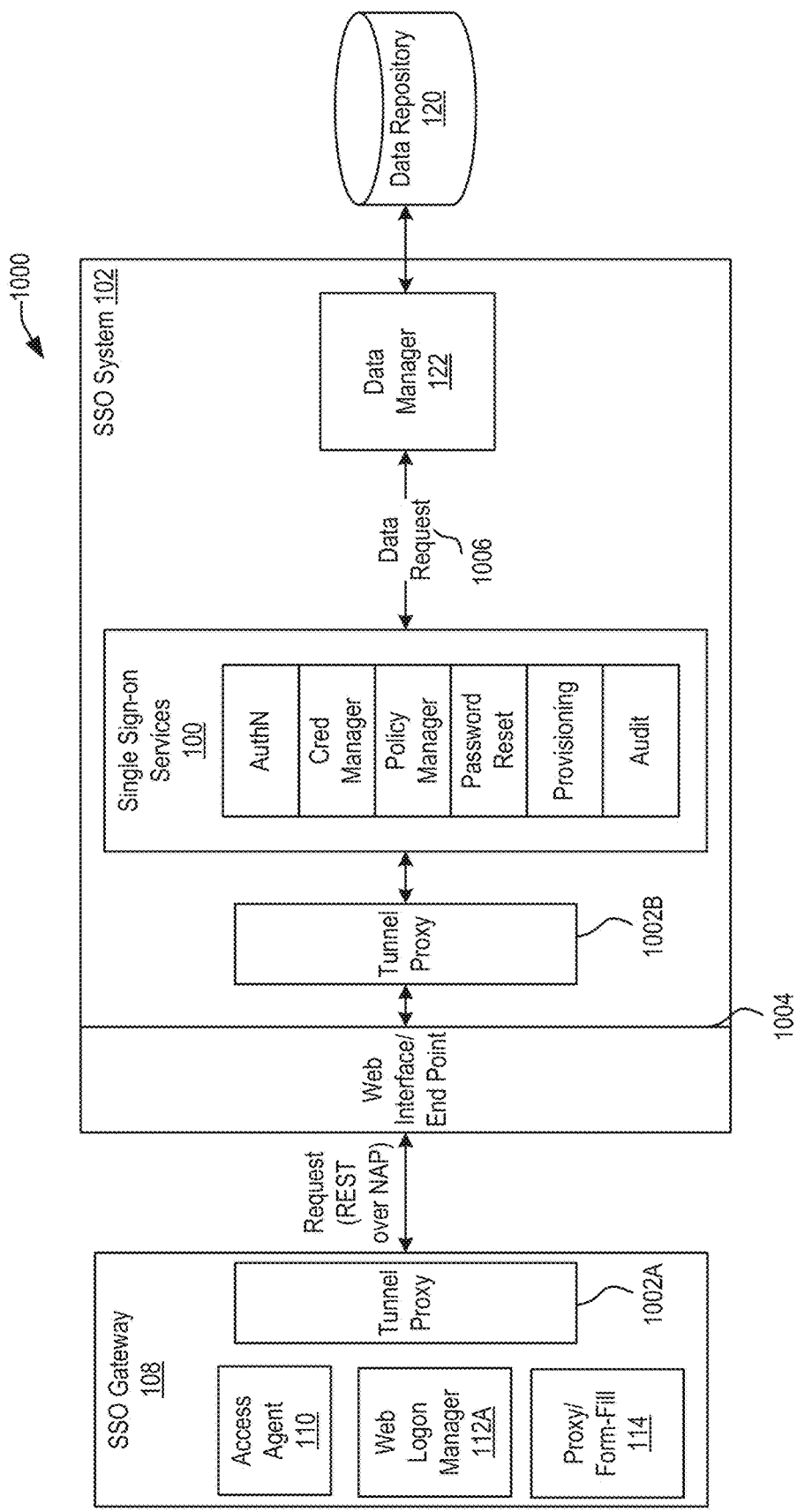
FIG. 10 illustrates an SSO server architecture integrating single sign-on services, in accordance with an embodiment of the present invention.

FIG. 10 illustrates an SSO server architecture 1000 integrating single sign-on services, in accordance with an embodiment of the present invention. Single sign-on, whether web-based or desktop-based, requires policy management services and credential management services. As described above, policies define how a single sign-on system interacts with applications and credentials are used to authenticate users to gain access to the applications. Embodiments of the present invention are directed to providing web-based single sign-on. Each single sign-on service 100 can be exposed using a web interface 104, such as a REST interface. As described above, by using a web interface, different types of clients 106 can access the single sign-on services 100, and new clients can easily be added. In some embodiments, each SSO service 100 can be associated with a different web interface. The web interfaces provide a simply way to create, read, update, and delete (CRUD) policies and credentials.

Clients 106 can send requests for single sign-on services, for example a request for policies or credentials, to an SSO system 102 through an SSO gateway 108. As shown in FIG. 10, requests from clients 106 can be received by an SSO Gateway 108, through an access agent 110, a web logon manager interface 112A, and/or SSO application 114. The request can be, e.g., a REST request tunneled over an access protocol (such as NAP or OAP). In some embodiments, a single web interface can be used to access the single sign-on services. In some embodiments, each single sign-on service can be associated with a service-specific web interface.

In some embodiments, when a request is made to the SSO services through the access agent, logon manager, or proxy, the requests can be received from a client as HTTP or HTTPS requests. SSO gateway 108 can include a tunnel proxy 1002A which can tunnel the HTTP requests over NAP (Network Access Protocol) or OAP (Oracle Access Protocol) to the SSO server 102. An NAP or OAP connection can be opened between the SSO gateway 108 and an NAP/OAP endpoint 1004 at the SSO server 102. In some embodiments, the NAP/OAP endpoint 1004 can be a web interface that is accessed through a designated URL. A tunnel proxy 1002B at the SSO server 102 can then convert the requests back to HTTP or HTTPS and send the converted requests to the appropriate SSO service 100 at the SSO server 102. In some embodiments, services can register with the tunnel proxy 1002B in order to receive tunneled requests and send tunneled responses through the tunnel proxy. Responses from the SSO server 102 to the requesting client can be similarly tunneled back (e.g., an HTTP or HTTPS response generated by the requested service 100 can be received by tunnel proxy 1002B which can convert the request to NAP/OAP and the tunneled response can then be sent to tunnel proxy 1002A through web interface 1004).

For example, a URL can be configured that is tunneled from the SSO gateway 108 to the SSO server 102. In some embodiments, the URL can be mapped to a servlet or JSP page at the SSO server 102 that corresponds to an SSO service 100. When an HTTP/S request is sent to the URL, the HTTP/S request is converted to a NAP/OAP request and is forwarded over an NAP/OAP connection to the SSO server 102. The SSO server 102 end point 1004 receives the NAP/OAP request and passes the request to the tunnel proxy 1002B. The tunnel proxy 1002B can convert the NAP/OAP request to an HTTP/S request and send the request to the appropriate service. For example, the tunnel proxy can convert the NAP/OAP request to an HTTPServletRequest and invoke the appropriate servlet (such as a compiled Servlet from a JSP file in case of JSP). The response can be converted back to NAP/OAP by the tunnel proxy 1002B and passed back to the NAP/OAP end point 1004. The NAP/OAP response is then returned to the SSO gateway where tunnel proxy 1002A can convert the NAP/OAP response back to an HTTP/HTTPS response that is returned to the client, such as the user's browser.

In some embodiments, requests received through a web interface layer 1004 (such as a REST layer) for resources (such as access to applications, credentials, policies, or other data) can be analyzed to determine whether the requested resource is protected and whether there is an authentication cookie included with the request. If an authentication cookie is not provided, or has expired, and the requested resource is protected, then the request can be redirected to an authentication service, such as Oracle Authentication Manager available from Oracle International Corporation, Redwood Shores, Calif. The authentication service can request credentials from the user (e.g., a username and password). When the authentication service receives the credentials, the authentication service can validate the credentials and if valid, return an authentication cookie to the user's browser. The resource request can then be redirected to the web interface layer, where the authentication cookie provides access to the requested resource. In some embodiments, when a user ends their session, either through a timeout or an affirmative log out, the web interface layer can destroy session information and return the user to a logon screen.

Figure 11A:
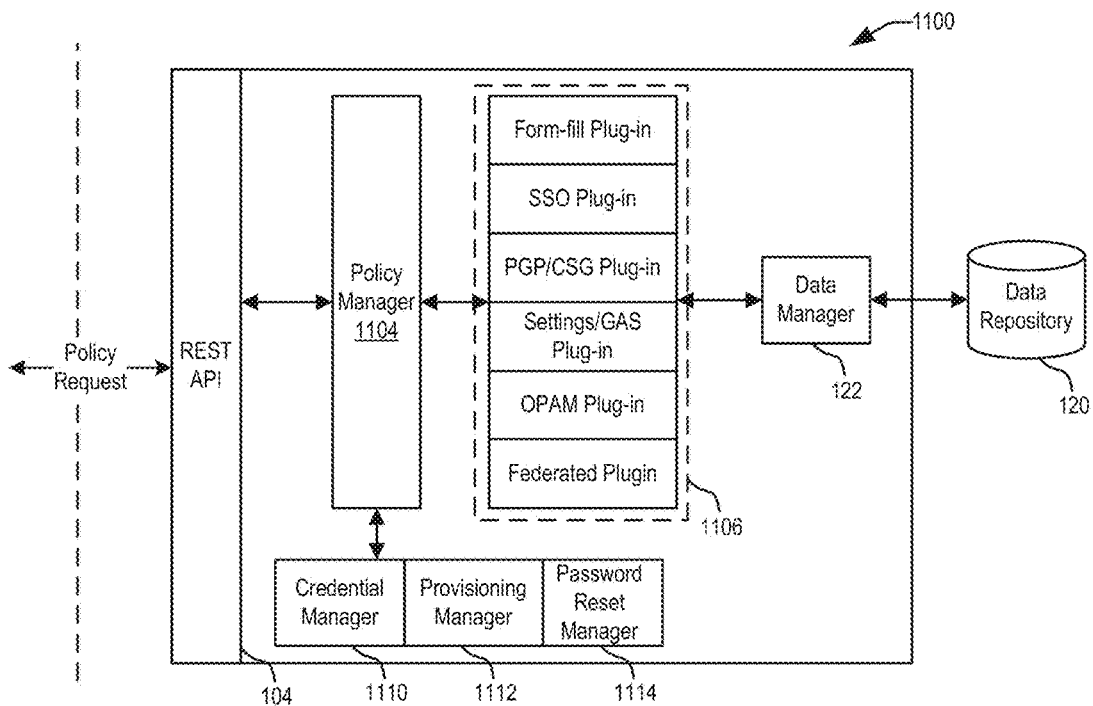
FIGS. 11A and 11B illustrate a policy manager architecture and a credential manager architecture, in accordance with an embodiment of the present invention.
Figure 11B:
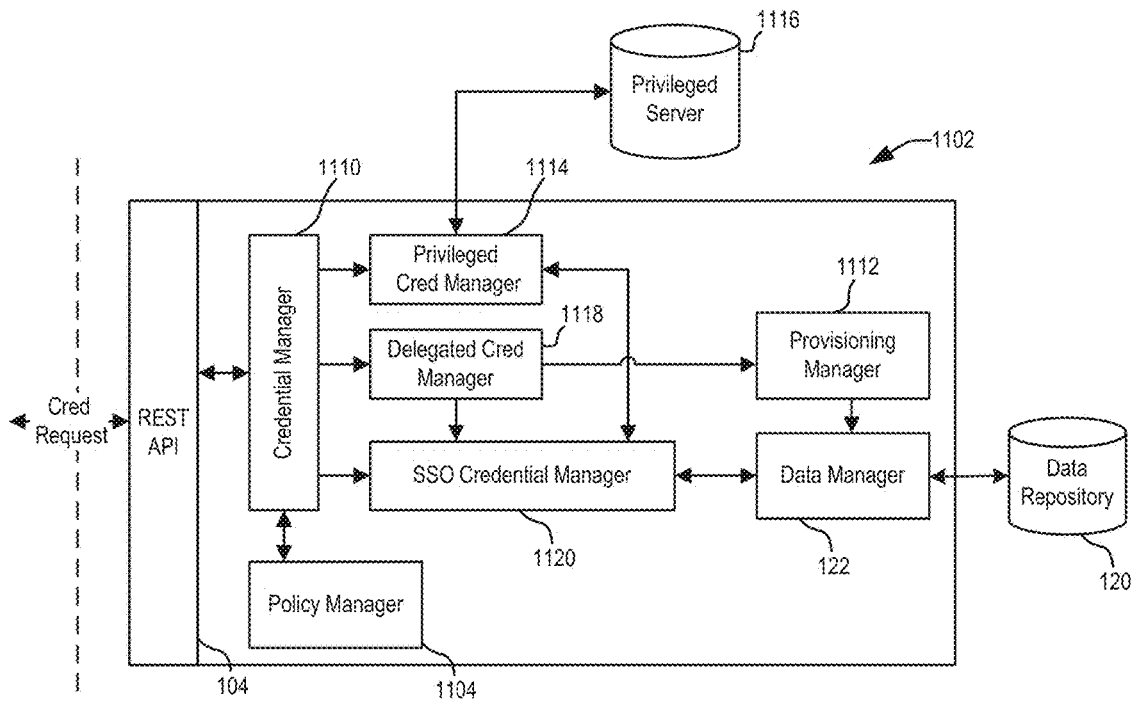

FIGS. 11A and 11B illustrate a policy manager architecture 1100 and a credential manager architecture 1102, in accordance with an embodiment of the present invention. As shown in FIG. 11A, a policy manager 1104 can provide centralized access to SSO policy management services 1106, such as storing and retrieving policies across multiple policy repositories/systems. The policy manager 1104 can be associated with a web interface 104 (e.g., a REST interface) such that the policy manager can receive requests and send responses over the web. This makes the policy manager platform independent, as it is operable to interact with any client that can send and receive web-based messages. In some embodiments, the policy manager 1104 can be used to manage user and administrative policies. The policy manager 1104 can be configured to support different access control types using plug-ins 1106. Each plug-in can include one or more methods for creating, reading, updating, and deleting policies specific to the plug-ins corresponding policy type. To add support for a new access control type, a new plug-in can be provided to the policy manager.

In some embodiments, policy manager 1104 can provide a layer of abstraction from the particular policy types, e.g., a client need only know how to communicate with the policy manager 1104 through the web interface 104, and not with each underlying policy type. When a request is received by the policy manager 1104, the policy manager can determine the policy type associated with the request and, using a corresponding plugin 1106, generate a policy-type specific request. The policy manager 1104 can send the policy type-specific request to a data manager 122. As further described below, data manager 122 provides a layer of abstraction to the various data sources. The data manager can identify data responsive to the request and return the identified data to the policy manager. For example, a search request from the policy manager can return a list of policies responsive to search criteria included with the request (e.g., filters, policy identifiers, types of policies, etc.). In some embodiments, if no criteria are provided then all policies can be fetched and returned. When a new policy is added, policy manager 1104 can create an identifier and then associate the new policy with the identifier. In some embodiments, multiple policies can be associated with the same identifier. The policy manager 1104 can then pass a list including the identifier and policy to the data manager 122. Similarly, an update operation can include identifiers associated with one or more existing policies and updated policy information. The policy manager 1104 can send the identifier and updated policies to the data manager 122 which can store the updated policies. Delete requests can include a set of identifiers, and the data manager 122 can delete the identified policies and return status information for the deletion. In some embodiments, policy management requests can be received from an end user through a client device and/or from an administrator through an administration console.

In some embodiments, policy manager 1104 can manage application templates. Each application template can be an object that includes a definition of how SSO services are to be provided to a particular application. For example, an application template can define how the SSO system is to interact with, match, inject, and provide SSO services to a particular application. A given application template can be associated with one or more sub-forms that can each correspond to various match types (e.g., login UI, password change UI, success/failure UIs, method of interaction, etc.). In some embodiments, a particular application templates can be associated with many users, and a user can have access to many application templates. Additionally, in some embodiments, an application template can be associated with many credentials. In some embodiments, an application template can be associated with one or more other policies (e.g., a password policy, a credential sharing policy, etc.).

In some embodiments, policy manager 1104 can manage password policies. As described above, each password policy can be associated with one or more application templates that share the password policy. Password policies can be used by provisioning manager 1112 and/or password reset manager 1114 when establishing or updating a password for an application. In some embodiments, a password policy can be used to automatically generate a password during provisioning and/or password reset or can be used to validate passwords received from a user. In some embodiments, policy manager 1104 can manage administration policies that override user or locally deployed settings.

As shown in FIG. 11B, a credential manager 1110 can provide centralized access for end-user credential management across one or more different credential types stored in different repositories 120. Credential manager 1110 can abstract credential management operations from the client, simplifying the development of new clients by reducing the amount of logic required. Additionally, the credential manager 1110 is platform independent and can communicate with any client operable to send and receive messages over the web.

In some embodiments, a credential manager 1110 can manage storing and retrieving credentials across multiple repositories 120 and provides backward compatibility to access existing user credentials. The credential manager 1110 can enable clients to manage various types of SSO credentials including delegated and privileged credentials. Through web interface 104, the credential manager can publish an API that provides CRUD operations for credentials such as get, add, update and delete. This provides a layer of abstraction from each credential store, e.g., a client need only know how to communicate with the credential manager, rather than how to communicate with multiple supported credential data store. When the credential manager 1110 receives a credential request through web interface 104, the credential manager can analyze the request with one or more sub-managers corresponding to different types of credentials (such as Privileged Credential Manager 1114, Delegated Credential Manager 1118, and SSO Credential Manager 1120) to identify the appropriate credential data store and to fulfill the credential request.

In some embodiments, a credential manager 1110 can receive a credentials request for a given user. The credential manager 1110 can send requests to each sub-manager 1114, 1118, 1120 to identify credentials associated with the user and to return any matching credentials. In some embodiments, a credential manager 1110 can receive a request to get a credential, such as a privileged account credential. The credential manager can send a request to get the credential to a corresponding sub-manager (e.g., to add a privileged account credential the credential manager can send a request to the Privileged Credential Manager 1114) to get that credential. The corresponding sub-manager can check-out the credential (e.g., from privileged server 1116), and return the credential to the credential manager 1110. In some embodiments, sensitive fields of the credential can be encrypted prior to send the credential to the credential manager 1110.

In some embodiments, when a get credentials operation is received by credential manager 1110 the credential manager can request a list of credentials based on the request (e.g., associated with a user identified in the request, a credential ID, a credential type, or other criteria). In some embodiments, if no criteria are specified in the request, credential manager 1110 can request all credentials associated with the requesting user. In some embodiments, credential manager 1110 can receive a request to add a credential or credentials for a user or users. Credential manager 1110 can generate a credential identifier for each credential and call a corresponding sub-manager, based on the type of credential to be added. The sub-manager can validate the received credentials and send a request to data manager 122 to store the credentials in the appropriate data repository 120. A status of each added credential can be returned by the data manager. Similarly, credential manager 1110 can receive a request to update credentials. The credential manager 1110 can send a request to each corresponding sub-manager, including the updated credentials. The sub-manager can validate the updated credentials and send a request to data manager 122 to store the updated credentials. An update status can be returned. In some embodiments, a credential manager 1110 can receive a request to delete a credential. The credential manager 1110 can identify a corresponding sub-manager and send a request to the sub-manager to delete the credential. In some embodiments, if the credential has been delegated, the delegation can be revoked prior to deletion.

Figure 12:
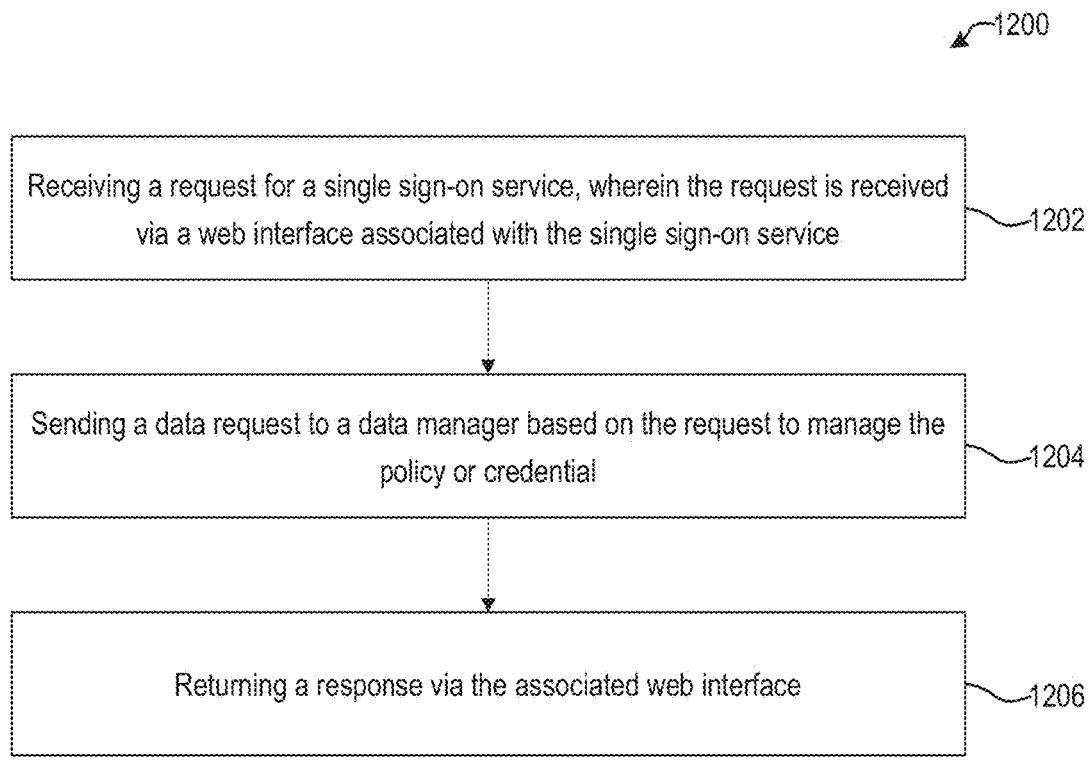
FIG. 12 depicts a block diagram of a method of providing SSO services through web-based interfaces, in accordance with an embodiment of the present invention.

FIG. 12 depicts a block diagram of a method 1200 of providing SSO services through web-based interfaces, in accordance with an embodiment of the present invention. At block 1202, a request is received for a single sign-on service. The request can be received from a client device, administration console, an application, or any other entity. The request can be received via a web interface associated with the single sign-on service. In some embodiments, a single web interface may serve as a central entry point for all requests directed to one or more SSO services. When a request is received, a particular SSO service associated with that request can be identified and the request can be forwarded to an endpoint associated with that SSO service.

In some embodiments, the request can be received in a first protocol by a proxy that converts the request from the first protocol to a second protocol and forwards the converted request to the single sign-on service. For example, the request can be an HTTP/S request and the proxy can tunnel the HTTP/S request over an access protocol such as NAP or OAP. In some embodiments, a second proxy can receive the tunneled request and extract the HTTP/S request to be passed to the receiving SSO service. In some embodiments, responses can be similarly tunneled to be returned to the requesting client. For example, the second proxy can receive a response from an SSO service (e.g., including a requested credential, policy, verification message, etc.). The response may be an HTTP/S response. The proxy can tunnel the HTTP/S response using NAP, OAP, or similar access protocol, and return the tunneled response to the requesting client via the proxy.

At block 1204, a data request can be sent to a data manager based on the request to manage a policy or credential. In some embodiments, the request for an SSO service can be, e.g., a policy management request (such as a request to create, read, update or delete a policy) or a credential management request (such as a request to create, read, update or delete a credential).

Because different types of policies may be stored in different data sources, accessible through data source-specific interfaces, SSO systems traditionally only worked with a limited number of policy types. This limited the available options for end users or forced end users to support multiple application. However, as described above, embodiments of the present invention provide a policy manager that can receive requests through a first (generic) interface. The request can specify the particular policy management operations to be performed (e.g., CRUD operations) according to the interface. The policy management request can be data source agnostic (e.g., the request may not specify where or how policies are stored or include any data source specific operations). The policy manager can then identify a policy management plug-in associated with the policy management request and convert the policy management request to a format for a second (data source-specific) interface based on the identified policy management plug-in. The policy manager can then generate the data request based on the one or more policy management operations.

Similarly, credentials can be stored in various credential stores, each accessible through its own interface. This traditionally limited SSO applications to those using the same type of credential. Embodiments of the present invention provide a credential manager that can be configured to manage various types of credentials stored in different credential stores. When a credential management request is received, it can be sent to a credential manager. Like the policy manager, the credential manager can receive requests through a generic interface. This serves as an abstraction layer between the client making the credential management request and the particular credential store that can service the request. In some embodiments, the credential manager can identify a sub-manager associated with the credential management request and converts the credential management request to a format for a second interface based on the identified sub-manager. The second interface can correspond to a particular credential store managed by the sub-manager. The credential manager can then generate the data request based on the one or more policy management operations.

At block 1206, a response is returned via the associated web interface. The response can include data (e.g., a policy or credential) retrieved according to the request. In some embodiments, the response can indicate whether a create, update, or delete operation completed successfully or failed.

Virtualized Data Storage and Management of Policy and Credential Data Sources

As described above, embodiments of the present invention can support single sign-on for one or more different applications that utilize different access types, such as form-fill, federated, protected, and other types. Policies and credentials associated with the different access types can be stored in different types of repositories. In accordance with an embodiment, to support different access types through a unified interface, a virtualized data management system is provided that is agnostic to the actual physical storage (OID, AD, ADAM, Database etc.). The data management system can provide an SPI layer to manage credentials and policies. The data management system can also provide APIs to perform CRUD operations and can manage permissions (such as ACL Permissions and Data Level Permissions), agnostic of the data store container being used. In some embodiments, the data management system can use a multi hash map-based cache for faster data access.

In some embodiments, the data management system provides a centralized repository through which credentials, policies, administrative services, and other configuration and security services can be maintained. This enables users to access and consume SSO services through various clients 106. The data management system can present a unified interface to different repositories and services, such as Oracle Directory Servers (OID, ODSEE, OUD), Microsoft Active Directory, Microsoft ADAM/AD-LDS, and other LDAP-compliant directories, as well as SQL databases and local or networked file systems. Additionally, the data management is extensible, such that new data sources and services can be integrated with the data management system by implementing a compatible plugin.

In some embodiments, the data management system can synchronize credentials stored locally by a client with credentials stored in one or more credential-specific data stores managed by the data management system. When a synchronization event is triggered (e.g., at startup, or when credentials are added, deleted, or updated) the data management system can compare credential data stored in a client cache to credential data stored in the repositories managed by the data management systems. Credentials can be updated locally at the client (e.g., by the user) or directly at the credential repository (e.g., by an administrator or through a third party credential service). During synchronization, conflicts can be detected between credentials stored locally and credentials stored in one or more credential data stores. A conflict policy can define which credential is to be saved. In some embodiments, the most recently updated credential can be saved and any other credentials can be discarded. In some embodiments, the credentials stored in the credential data store can be saved and any other credentials stored locally can be discarded. Synchronization also maintains backwards compatibility with desktop-based SSO services. Desktop-based services use locally maintained credentials and policies to provide SSO services, so keeping the local store in sync with the web based repositories, the desktop-based SSO services can continue to provide up to date SSO services.

Figure 13:
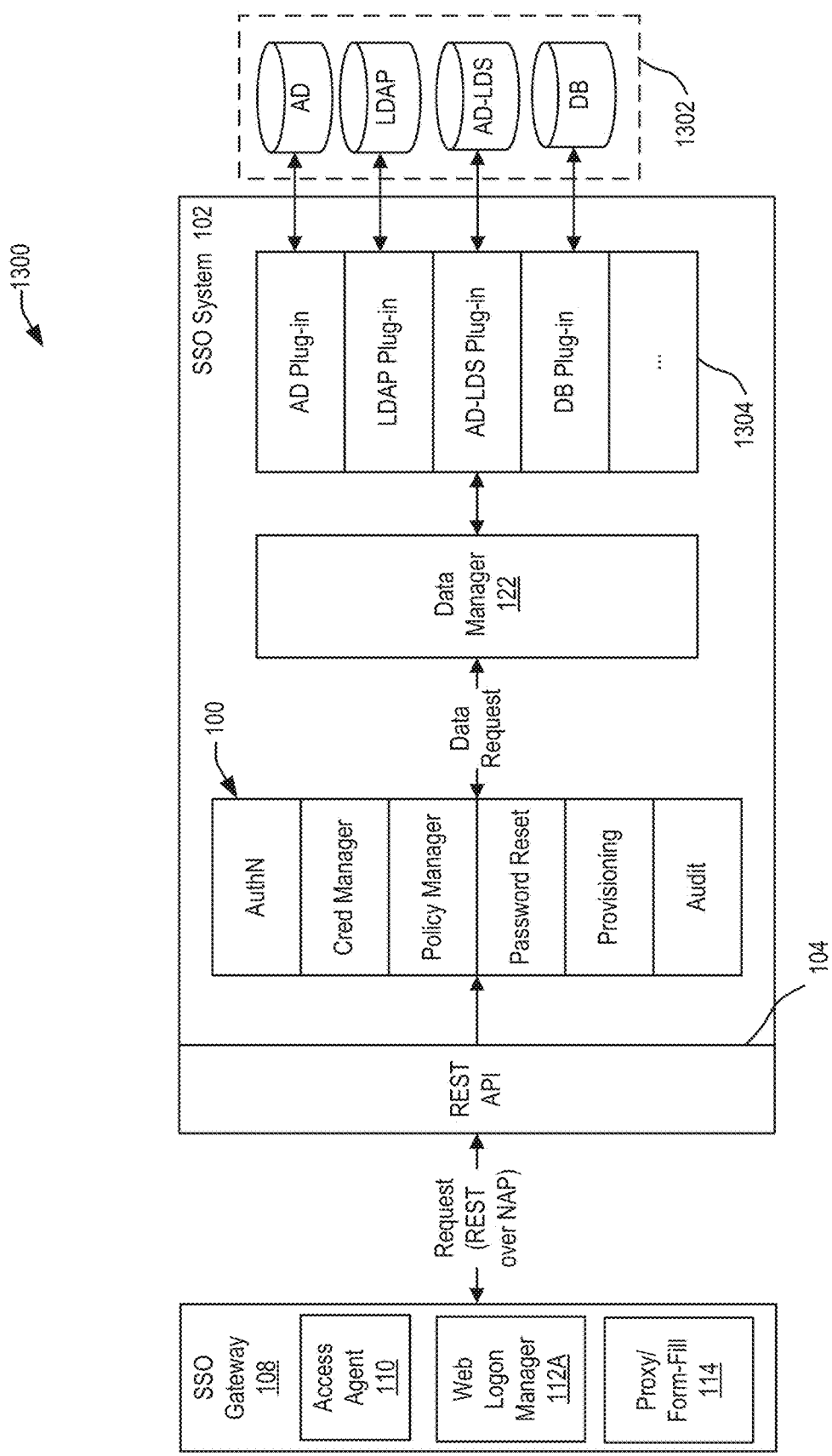
FIG. 13 illustrates a data manager architecture, in accordance with an embodiment of the present invention.

FIG. 13 illustrates a data manager architecture 1300, in accordance with an embodiment of the present invention. As shown in FIG. 13, a data manager 122 provides a centralized interface for SSO data management that can support one or more different physical storage systems 1302 via extensible plug-ins 1304. Each plug-in can enable the data requests received from the SSO services to be performed on the corresponding physical storage system. The data manager is extensible such that it can support new types of physical data sources by adding corresponding plug-ins. The data manager is backward compatible with desktop-based SSO services.

Data manager 122 provides a single interface to enable storing and retrieving policies across multiple repositories 1302. Data requests can be received by the data manager 122 through a single API that does not require specific repository information or repository-specific operations. Instead, the data manager 122 can identify the appropriate repository for the request and send a request to the appropriate repository through a corresponding plug-in 1304. In some embodiments, the data manager 122 provides an SPI layer that interfaces with each plug-in. The data manager 122 exposes a unified interface for CRUD operations related to Policy, Credential and Provisioning Data.

The SPI Layer can auto initialize each plug-in instance based on the type of CRUD Request. In some embodiments, data manager 122 can provide a generic interface which is used to perform CRUD operations without specifying the underlying data store 1202. In some embodiments, a generic interface can be provided for each type of operation (e.g., credential, policy, and provisioning operations). When a request is received through the generic interface, the data manager 122 can identify data store specific operations and connection information through configuration information maintained by the SSO system 102 (e.g., by data manager 122). The data manager 122 can then initialize the corresponding plug-in to communicate with the data store.

In some embodiments, when a plug-in instance is invoked for the first time and initialization happens, a Context Object Pool can be created for the Data Store. This can provide High Availability and thread safety. For each CRUD operation a separate context object can be assigned from the pool and returned back to the pool once the operation is completed. The Data Manager 122 can us connection pooling (e.g., provided by a JNDI service provider) and the context pooling to save resources by making a pool of connections when the application starts up, and reducing the time needed to create a connection or to disconnect. Additionally, by initiating a connection pool, management of connections to the data store can be simplified as connection creation, max number of connections for an application, max idle time for a connection, and other configuration details can be delegated to a Connection Pool Manager.

In some embodiments, one or more hash maps can be used by the data manager 122 to improve performance when looking up policies and credentials stored across the various data repositories 1302. In some embodiments, one hash map can map Policy Type to an identifier, and a policy object. Another hash map can map a Policy Name to a policy reference. Another hash map can map a key to a policy object. Another hash map can map a value to a list of policy objects.

In some embodiments, create, read update and delete (CRUD) operations can be supported for credential, policy, and provisioning services. Each CRUD operation can be exposed by data manager 122 through a web interface. For example, credential operations can include creating a new credential for a specified object (e.g., an application or service), reading (e.g., retrieving) a credential associated with a user and at least one application, updating a specified credential (e.g., modifying the credential or providing a new credential), and deleting a credential for a specified object. Similar operations can be provided for policy and provisioning services.

In some embodiments, the data manager 122 can support CRUD operations performed on policy data, including: Application Templates, Password Policies, Credential Sharing Groups, and administrative data. In some embodiments, data manager 122 can further support CRUD operations on Credential data, Provisioning data (e.g., Instructions/Keys), User Settings, Data Management settings, User Secrets (UAM), Encryption Keys (UAM), and Enrollment Credentials (UAM).

Figure 14:
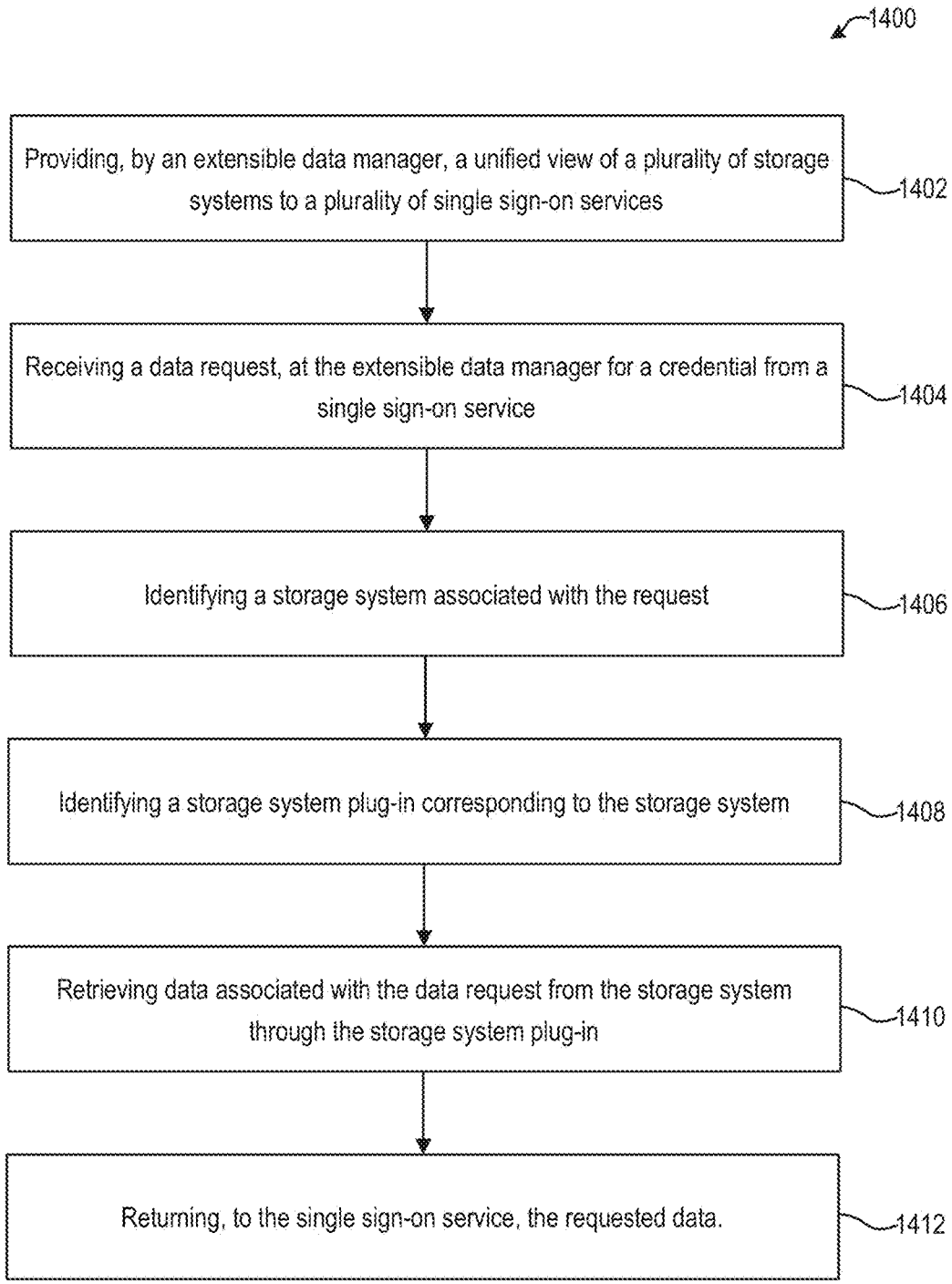
FIG. 14 depicts a block diagram of a method of managing credentials stored across multiple data stores, in accordance with an embodiment of the present invention.

FIG. 14 depicts a block diagram of a method 1400 of managing credentials stored across multiple data stores, in accordance with an embodiment of the present invention. At block 1402, an extensible data manager can provide a unified view of one or more storage systems to one or more single sign-on services. In some embodiments, each single sign-on service is associated with a web interface.

At block 1404, a data request can be received at the extensible data manager for a credential from a single sign-on service. The extensible data manager can act as an abstraction layer for the one or more storage systems, such that requests can be storage system agnostic. For example, the data request can include criteria that can be used to identify the requested credential or credentials. The criteria may be broad enough to correspond to different types of credentials. Under previous systems, a user would have to separately search different credential stores for matching credentials. However, in accordance with an embodiment of the present invention, the data manager can receive one request and search across multiple credential stores.

At block 1406, at least one storage system associated with the request can be identified. For example, based on criteria included with the request, such as a credential ID, credential type, or other criteria, the data manager can identify one or more corresponding storage systems. In some embodiments, the data manager can use a hash map to identify relevant storage systems using the criteria.

At block 1408, a storage system plug-in corresponding to each of the at least one storage system can be identified. The data manager can include an SPI layer through which a number of storage systems can interface by providing a plug-in. Each plug-in can convert data requests received at the data manager through the first (e.g., generic) interface, to be compatible with the plug-in's corresponding storage system. In some embodiments, support for new storage systems can be provided by adding a plug-in to the data manager. The data manager can receive a storage system plug-in associated with the new storage system from an administrator. In some embodiments, the plug-in can implement the SPI provided by the data manager. The data manager can verify the plug-in (e.g., ensure that any required methods or configuration files are provided) and then add the storage system plug-in to SPI layer.

At block 1410, data associated with the data request can be retrieved from the storage system using the storage system plug-in. In some embodiments, the converted data request can then be sent to the storage system through a second interface (specific to the storage system) to create, read, update, or delete data associated with the data request. The retrieved data can include a requested credential or policy, or verification of the successful completion or failure of a create, update, or delete operation.

At block 1412, the requested data can be returned to the SSO service. In some embodiments, the requested data can include one or more credentials matching a search request. In some embodiments, the requested data can include a verification of the success or failure of a create, update, or delete operation. In some embodiments, the data manager can receive a response from the storage system through the second (storage system-specific) interface, including the credential. The data manager can encrypt at least a portion of the credential and reformat the response based on the first interface before returning the response through the first interface.

In some embodiments, the data manager can also receive data requests related to a policy associated with an application. The data manager can identify at least one storage system associated with the request and at least one storage system plug-in corresponding to the at least one storage system. The data manager can then create, read, update, or delete one or more policies associated with the application from the at least one storage system through the at least one storage system plug-in. In some embodiments, the data manager can convert the request from the first (e.g., generic) interface to a second (e.g., policy store-specific) interface and send the converted data request to the storage system through the second interface to retrieve at least one policy responsive to the second data request. Responses can be similarly reformatted from the second interface to the first interface before returning the response to the requesting application.

Figure 15:
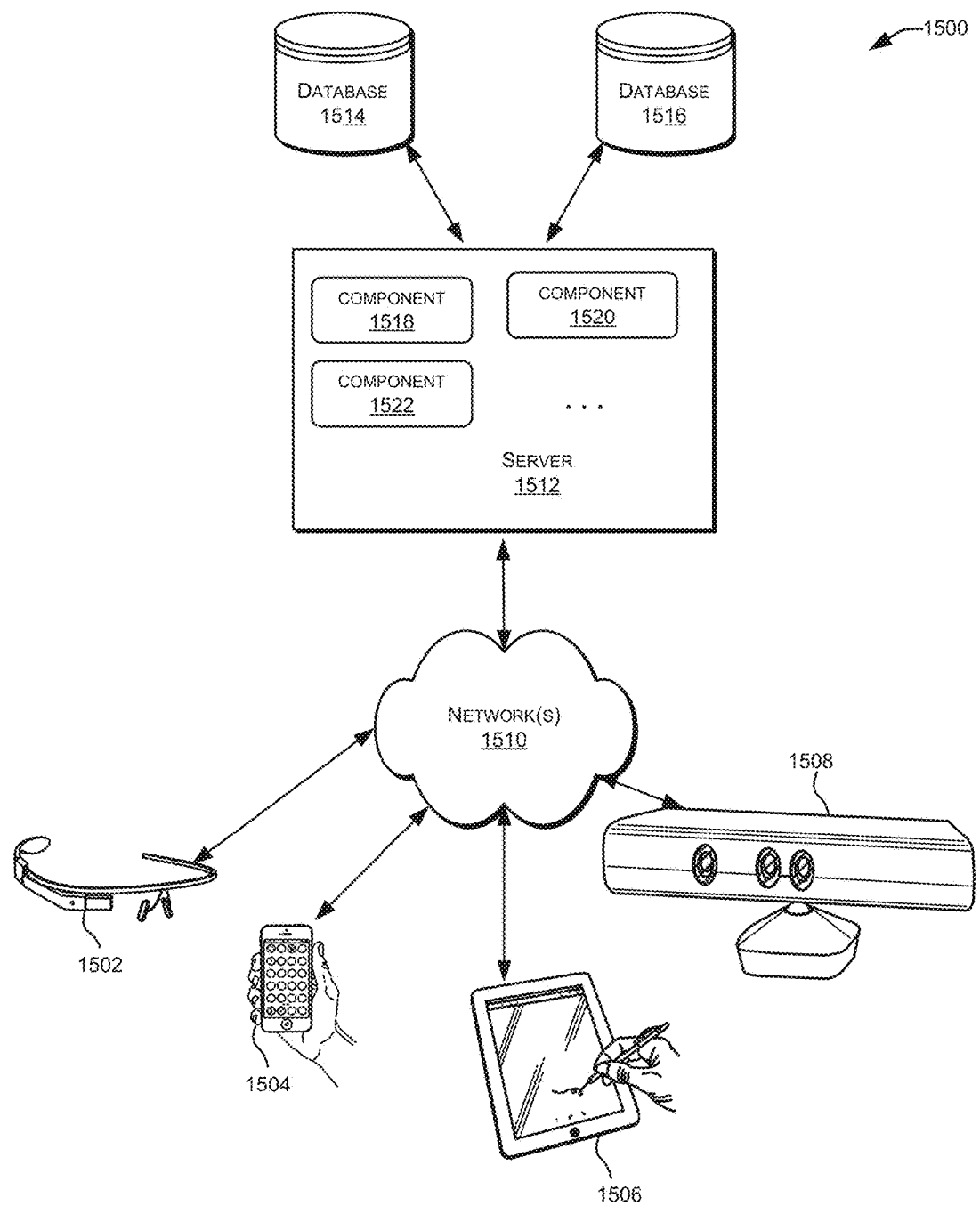
FIG. 15 depicts a simplified diagram of a distributed system for implementing one of the embodiments.

FIG. 15 depicts a simplified diagram of a distributed system 1500 for implementing one of the embodiments. In the illustrated embodiment, distributed system 1500 includes one or more client computing devices 1502, 1504, 1506, and 1508, which are configured to execute and operate a client application such as a web browser, proprietary client (e.g., Oracle Forms), or the like over one or more network(s) 1510. Server 1512 may be communicatively coupled with remote client computing devices 1502, 1504, 1506, and 1508 via network 1510.

In various embodiments, server 1512 may be adapted to run one or more services or software applications provided by one or more of the components of the system. In some embodiments, these services may be offered as web-based or cloud services or under a Software as a Service (SaaS) model to the users of client computing devices 1502, 1504, 1506, and/or 1508. Users operating client computing devices 1502, 1504, 1506, and/or 1508 may in turn utilize one or more client applications to interact with server 1512 to utilize the services provided by these components.

In the configuration depicted in the figure, the software components 1518, 1520 and 1522 of system 1500 are shown as being implemented on server 1512. In other embodiments, one or more of the components of system 1500 and/or the services provided by these components may also be implemented by one or more of the client computing devices 1502, 1504, 1506, and/or 1508. Users operating the client computing devices may then utilize one or more client applications to use the services provided by these components. These components may be implemented in hardware, firmware, software, or combinations thereof. It should be appreciated that various different system configurations are possible, which may be different from distributed system 1500. The embodiment shown in the figure is thus one example of a distributed system for implementing an embodiment system and is not intended to be limiting.

Client computing devices 1502, 1504, 1506, and/or 1508 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1502, 1504, 1506, and 1508 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1510.

Although exemplary distributed system 1500 is shown with four client computing devices, any number of client computing devices may be supported. Other devices, such as devices with sensors, etc., may interact with server 1512.

Network(s) 1510 in distributed system 1500 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1510 can be a local area network (LAN), such as one based on Ethernet, Token-Ring and/or the like. Network(s) 1510 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1512 may be adapted to run one or more services or software applications described in the foregoing disclosure. For example, server 1512 may correspond to a server for performing processing described above according to an embodiment of the present disclosure.

Server 1512 may run an operating system including any of those discussed above, as well as any commercially available server operating system. Server 1512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1512 may include one or more applications to analyze and consolidate data feeds and/or event updates received from users of client computing devices 1502, 1504, 1506, and 1508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1512 may also include one or more applications to display the data feeds and/or real-time events via one or more display devices of client computing devices 1502, 1504, 1506, and 1508.

Distributed system 1500 may also include one or more databases 1514 and 1516. Databases 1514 and 1516 may reside in a variety of locations. By way of example, one or more of databases 1514 and 1516 may reside on a non-transitory storage medium local to (and/or resident in) server 1512. Alternatively, databases 1514 and 1516 may be remote from server 1512 and in communication with server 1512 via a network-based or dedicated connection. In one set of embodiments, databases 1514 and 1516 may reside in a storage-area network (SAN). Similarly, any necessary files for performing the functions attributed to server 1512 may be stored locally on server 1512 and/or remotely, as appropriate. In one set of embodiments, databases 1514 and 1516 may include relational databases, such as databases provided by Oracle, that are adapted to store, update, and retrieve data in response to SQL-formatted commands.

Figure 16:
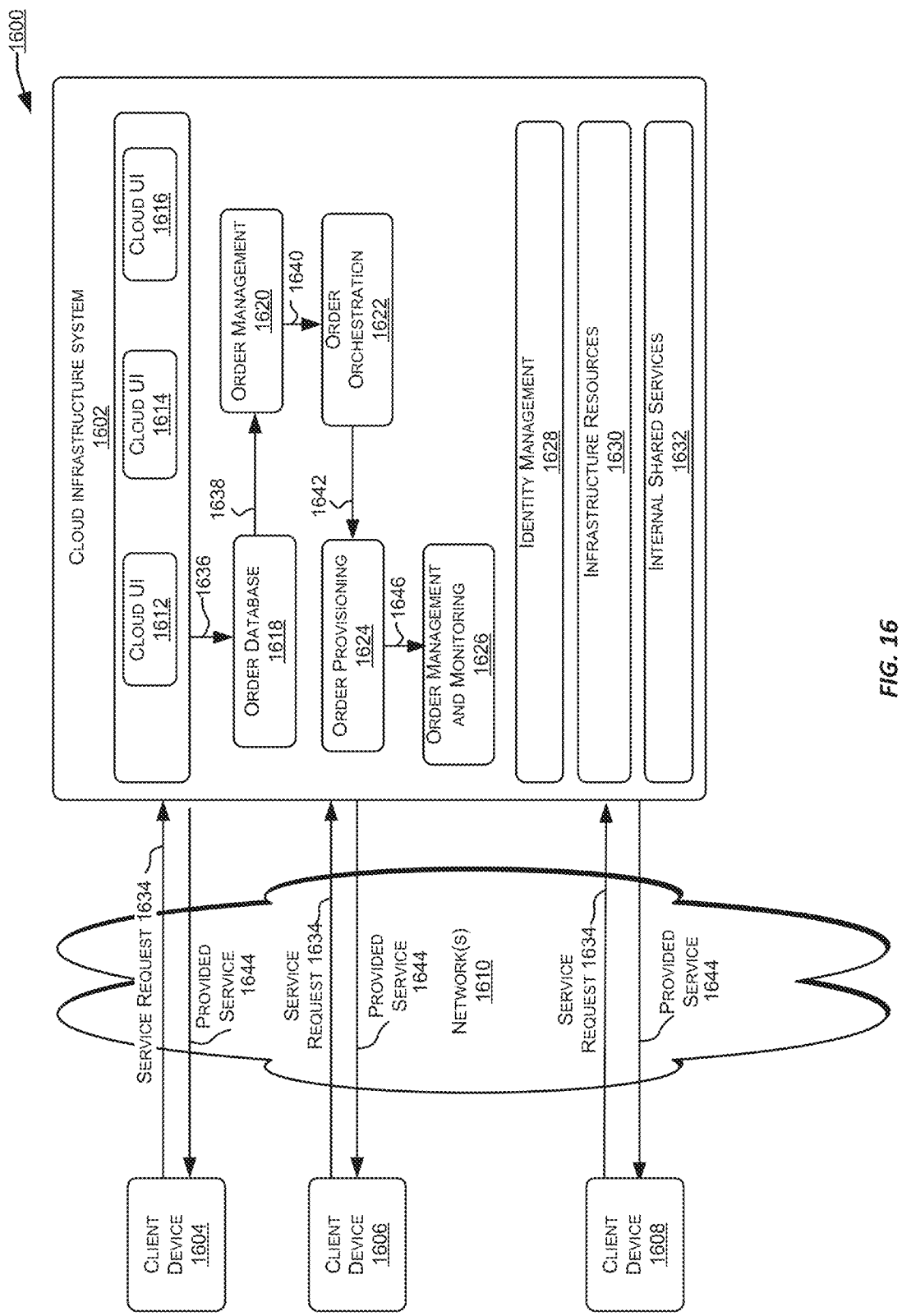
FIG. 16 is a simplified block diagram of components of a system environment by which services provided by the components of an embodiment system may be offered as cloud services, in accordance with an embodiment of the present disclosure.

FIG. 16 is a simplified block diagram of one or more components of a system environment 1600 by which services provided by one or more components of an embodiment system may be offered as cloud services, in accordance with an embodiment of the present disclosure. In the illustrated embodiment, system environment 1600 includes one or more client computing devices 1604, 1606, and 1608 that may be used by users to interact with a cloud infrastructure system 1602 that provides cloud services. The client computing devices may be configured to operate a client application such as a web browser, a proprietary client application (e.g., Oracle Forms), or some other application, which may be used by a user of the client computing device to interact with cloud infrastructure system 1602 to use services provided by cloud infrastructure system 1602.

It should be appreciated that cloud infrastructure system 1602 depicted in the figure may have other components than those depicted. Further, the embodiment shown in the figure is only one example of a cloud infrastructure system that may incorporate an embodiment of the invention. In some other embodiments, cloud infrastructure system 1602 may have more or fewer components than shown in the figure, may combine two or more components, or may have a different configuration or arrangement of components.

Client computing devices 1604, 1606, and 1608 may be devices similar to those described above for 1502, 1504, 1506, and 1508.

Although exemplary system environment 1600 is shown with three client computing devices, any number of client computing devices may be supported. Other devices such as devices with sensors, etc. may interact with cloud infrastructure system 1602.

Network(s) 1610 may facilitate communications and exchange of data between clients 1604, 1606, and 1608 and cloud infrastructure system 1602. Each network may be any type of network familiar to those skilled in the art that can support data communications using any of a variety of commercially-available protocols, including those described above for network(s) 1510.

Cloud infrastructure system 1602 may comprise one or more computers and/or servers that may include those described above for server 1512.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1602 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1602 may be adapted to automatically provision, manage and track a customer's subscription to services offered by cloud infrastructure system 1602. Cloud infrastructure system 1602 may provide the cloud services via different deployment models. For example, services may be provided under a public cloud model in which cloud infrastructure system 1602 is owned by an organization selling cloud services (e.g., owned by Oracle) and the services are made available to the general public or different industry enterprises. As another example, services may be provided under a private cloud model in which cloud infrastructure system 1602 is operated solely for a single organization and may provide services for one or more entities within the organization. The cloud services may also be provided under a community cloud model in which cloud infrastructure system 1602 and the services provided by cloud infrastructure system 1602 are shared by several organizations in a related community. The cloud services may also be provided under a hybrid cloud model, which is a combination of two or more different models.

In some embodiments, the services provided by cloud infrastructure system 1602 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1602. Cloud infrastructure system 1602 then performs processing to provide the services in the customer's subscription order.

In some embodiments, the services provided by cloud infrastructure system 1602 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1602 may also include infrastructure resources 1630 for providing the resources used to provide various services to customers of the cloud infrastructure system. In one embodiment, infrastructure resources 1630 may include pre-integrated and optimized combinations of hardware, such as servers, storage, and networking resources to execute the services provided by the PaaS platform and the SaaS platform.

In some embodiments, resources in cloud infrastructure system 1602 may be shared by multiple users and dynamically re-allocated per demand. Additionally, resources may be allocated to users in different time zones. For example, cloud infrastructure system 1630 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1632 may be provided that are shared by different components or modules of cloud infrastructure system 1602 and by the services provided by cloud infrastructure system 1602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1602 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1602, and the like.

In one embodiment, as depicted in the figure, cloud management functionality may be provided by one or more modules, such as an order management module 1620, an order orchestration module 1622, an order provisioning module 1624, an order management and monitoring module 1626, and an identity management module 1628. These modules may include or be provided using one or more computers and/or servers, which may be general purpose computers, specialized server computers, server farms, server clusters, or any other appropriate arrangement and/or combination.

In exemplary operation 1634, a customer using a client device, such as client device 1604, 1606 or 1608, may interact with cloud infrastructure system 1602 by requesting one or more services provided by cloud infrastructure system 1602 and placing an order for a subscription for one or more services offered by cloud infrastructure system 1602. In certain embodiments, the customer may access a cloud User Interface (UI), cloud UI 1612, cloud UI 1614 and/or cloud UI 1616 and place a subscription order via these UIs. The order information received by cloud infrastructure system 1602 in response to the customer placing an order may include information identifying the customer and one or more services offered by the cloud infrastructure system 1602 that the customer intends to subscribe to.

After an order has been placed by the customer, the order information is received via the cloud UIs, 1612, 1614 and/or 1616.

At operation 1636, the order is stored in order database 1618. Order database 1618 can be one of several databases operated by cloud infrastructure system 1618 and operated in conjunction with other system elements.

At operation 1638, the order information is forwarded to an order management module 1620. In some instances, order management module 1620 may be configured to perform billing and accounting functions related to the order, such as verifying the order, and upon verification, booking the order.

At operation 1640, information regarding the order is communicated to an order orchestration module 1622. Order orchestration module 1622 may utilize the order information to orchestrate the provisioning of services and resources for the order placed by the customer. In some instances, order orchestration module 1622 may orchestrate the provisioning of resources to support the subscribed services using the services of order provisioning module 1624.

In certain embodiments, order orchestration module 1622 enables the management of business processes associated with each order and applies business logic to determine whether an order should proceed to provisioning. At operation 1642, upon receiving an order for a new subscription, order orchestration module 1622 sends a request to order provisioning module 1624 to allocate resources and configure those resources needed to fulfill the subscription order. Order provisioning module 1624 enables the allocation of resources for the services ordered by the customer. Order provisioning module 1624 provides a level of abstraction between the cloud services provided by cloud infrastructure system 1600 and the physical implementation layer that is used to provision the resources for providing the requested services. Order orchestration module 1622 may thus be isolated from implementation details, such as whether or not services and resources are actually provisioned on the fly or pre-provisioned and only allocated/assigned upon request.

At operation 1644, once the services and resources are provisioned, a notification of the provided service may be sent to customers on client devices 1604, 1606 and/or 1608 by order provisioning module 1624 of cloud infrastructure system 1602.

At operation 1646, the customer's subscription order may be managed and tracked by an order management and monitoring module 1626. In some instances, order management and monitoring module 1626 may be configured to collect usage statistics for the services in the subscription order, such as the amount of storage used, the amount data transferred, the number of users, and the amount of system up time and system down time.

In certain embodiments, cloud infrastructure system 1600 may include an identity management module 1628. Identity management module 1628 may be configured to provide identity services, such as access management and authorization services in cloud infrastructure system 1600. In some embodiments, identity management module 1628 may control information about customers who wish to utilize the services provided by cloud infrastructure system 1602. Such information can include information that authenticates the identities of such customers and information that describes which actions those customers are authorized to perform relative to various system resources (e.g., files, directories, applications, communication ports, memory segments, etc.) Identity management module 1628 may also include the management of descriptive information about each customer and about how and by whom that descriptive information can be accessed and modified.

Figure 17:
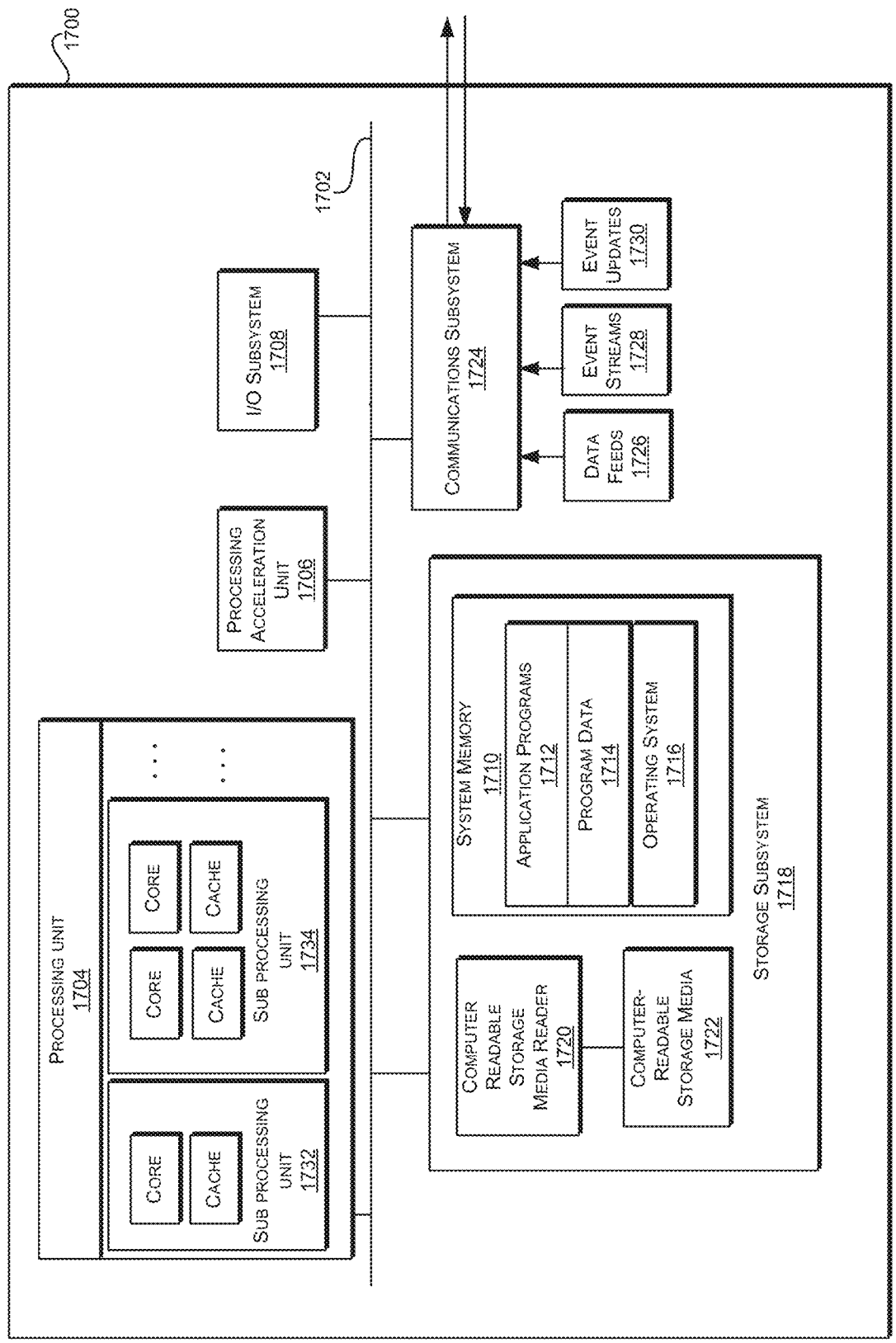
FIG. 17 illustrates an exemplary computer system, in which various embodiments of the present invention may be implemented.

FIG. 17 illustrates an exemplary computer system 1700, in which various embodiments of the present invention may be implemented. The system 1700 may be used to implement any of the computer systems described above. As shown in the figure, computer system 1700 includes a processing unit 1704 that communicates with a number of peripheral subsystems via a bus subsystem 1702. These peripheral subsystems may include a processing acceleration unit 1706, an I/O subsystem 1708, a storage subsystem 1718 and a communications subsystem 1724. Storage subsystem 1718 includes tangible computer-readable storage media 1722 and a system memory 1710.

Bus subsystem 1702 provides a mechanism for letting the various components and subsystems of computer system 1700 communicate with each other as intended. Although bus subsystem 1702 is shown schematically as a single bus, alternative embodiments of the bus subsystem may utilize multiple buses. Bus subsystem 1702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1704, which can be implemented as one or more integrated circuits (e.g., a conventional microprocessor or microcontroller), controls the operation of computer system 1700. One or more processors may be included in processing unit 1704. These processors may include single core or multicore processors. In certain embodiments, processing unit 1704 may be implemented as one or more independent processing units 1732 and/or 1734 with single or multicore processors included in each processing unit. In other embodiments, processing unit 1704 may also be implemented as a quad-core processing unit formed by integrating two dual-core processors into a single chip.

In various embodiments, processing unit 1704 can execute a variety of programs in response to program code and can maintain multiple concurrently executing programs or processes. At any given time, some or all of the program code to be executed can be resident in processor(s) 1704 and/or in storage subsystem 1718. Through suitable programming, processor(s) 1704 can provide various functionalities described above. Computer system 1700 may additionally include a processing acceleration unit 1706, which can include a digital signal processor (DSP), a special-purpose processor, and/or the like.

I/O subsystem 1708 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1700 may comprise a storage subsystem 1718 that comprises software elements, shown as being currently located within a system memory 1710. System memory 1710 may store program instructions that are loadable and executable on processing unit 1704, as well as data generated during the execution of these programs.

Depending on the configuration and type of computer system 1700, system memory 1710 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1704. In some implementations, system memory 1710 may include multiple different types of memory, such as static random access memory (SRAM) or dynamic random access memory (DRAM). In some implementations, a basic input/output system (BIOS), containing the basic routines that help to transfer information between elements within computer system 1700, such as during start-up, may typically be stored in the ROM. By way of example, and not limitation, system memory 1710 also illustrates application programs 1712, which may include client applications, Web browsers, mid-tier applications, relational database management systems (RDBMS), etc., program data 1714, and an operating system 1716. By way of example, operating system 1716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 17 OS, and Palm® OS operating systems.

Storage subsystem 1718 may also provide a tangible computer-readable storage medium for storing the basic programming and data constructs that provide the functionality of some embodiments. Software (programs, code modules, instructions) that when executed by a processor provide the functionality described above may be stored in storage subsystem 1718. These software modules or instructions may be executed by processing unit 1704. Storage subsystem 1718 may also provide a repository for storing data used in accordance with the present invention.

Storage subsystem 1700 may also include a computer-readable storage media reader 1720 that can further be connected to computer-readable storage media 1722. Together and, optionally, in combination with system memory 1710, computer-readable storage media 1722 may comprehensively represent remote, local, fixed, and/or removable storage devices plus storage media for temporarily and/or more permanently containing, storing, transmitting, and retrieving computer-readable information.

Computer-readable storage media 1722 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1700.

By way of example, computer-readable storage media 1722 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1722 may include, but is not limited to, Zip® drives, flash memory cards, universal serial bus (USB) flash drives, secure digital (SD) cards, DVD disks, digital video tape, and the like. Computer-readable storage media 1722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1700.

Communications subsystem 1724 provides an interface to other computer systems and networks. Communications subsystem 1724 serves as an interface for receiving data from and transmitting data to other systems from computer system 1700. For example, communications subsystem 1724 may enable computer system 1700 to connect to one or more devices via the Internet. In some embodiments communications subsystem 1724 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1724 can provide wired network connectivity (e.g., Ethernet) in addition to or instead of a wireless interface.

In some embodiments, communications subsystem 1724 may also receive input communication in the form of structured and/or unstructured data feeds 1726, event streams 1728, event updates 1730, and the like on behalf of one or more users who may use computer system 1700.

By way of example, communications subsystem 1724 may be configured to receive data feeds 1726 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1724 may also be configured to receive data in the form of continuous data streams, which may include event streams 1728 of real-time events and/or event updates 1730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1724 may also be configured to output the structured and/or unstructured data feeds 1726, event streams 1728, event updates 1730, and the like to one or more databases that may be in communication with one or more streaming data source computers coupled to computer system 1700.

Computer system 1700 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1700 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
   receiving, at a server, a request from a client device to access a web application;
   passing the request to the web application;
   receiving a response from the web application;
   augmenting the response with policy data and a single sign-on application to create an augmented response; and
   returning the augmented response to the client device;
   wherein the single sign-on application is configured to:
      identify a platform associated with the client device; and
      execute one or more operations that are specific to the associated platform;
   wherein the single sign-on application executes in a client browser and is further configured to:
      request a policy associated with the web application;
      match a page received from the web application to the policy;
      request, from the server, credentials associated with a user to access the web application;
      receive one or more credentials from the server and inject the received credentials into one or more fields on the page based on the policy; and
      submit the received credentials to the web application; and
   wherein the single sign-on application is further configured to invoke an automated logon chooser process that submits the received credentials to the single sign-on application such that, upon the single sign-on application detecting a successful logon with one of the received credentials, the single sign-on application sends an update request to the server to update the credentials associated with the user for the web application using the received credentials associated with the successful logon.

2. The method of claim 1, wherein the single sign-on application is a Javascript application.

3. The method of claim 1, further comprising:
   receiving a second request from the single sign-on application for the policy associated with the web application;
   sending a third request to a data manager for the policy;
   sending a second response to the single sign-on application including the policy.

4. The method of claim 1, further comprising:
   receiving a second request from the single sign-on application for a credential associated with the user to access the web application;
   sending a third request to a data manager for the credential;
   sending a second response to the single sign-on application including the credential.

5. The method of claim 1, wherein the associated platform includes one or more of a client device type and a browser application type.

6. A non-transitory computer readable storage medium including instructions stored thereon which when executed by a processor cause the processor to perform the steps of:
   receiving a request to access a web application;
   passing the request to the web application;
   receiving a response from the web application;
   augmenting the response with policy data and a single sign-on application to create an augmented response; and
   returning the augmented response;
   wherein the single sign-on application is configured to:
      identify a platform associated with a client device; and
      execute one or more operations that are specific to the associated platform;
   wherein the single sign-on application executes in a client browser and is further configured to:
      request a policy associated with the web application;
      match a page received from the web application to the policy;
      request, from the server, credentials associated with a user to access the web application;
      receive one or more credentials from the server and inject the received credentials into one or more fields on the page based on the policy; and
      submit the received credentials to the web application; and
   wherein the single sign-on application is further configured to invoke an automated logon chooser process that submits the received credentials to the single sign-on application such that, upon the single sign-on application detecting a successful logon with one of the received credentials, the single sign-on application sends an update request to the server to update the credentials associated with the user for the web application using the received credentials associated with the successful logon.

7. The non-transitory computer readable storage medium of claim 6, wherein the single sign-on application is a Javascript application.

8. The non-transitory computer readable storage medium of claim 6, further including instructions stored thereon which when executed by the processor cause the processor to perform the steps of:
   receiving a second request from the single sign-on application for the policy associated with the web application;
   sending a third request to a data manager for the policy;
   sending a second response to the single sign-on application including the policy.

9. The non-transitory computer readable storage medium of claim 6, further including instructions stored thereon which when executed by the processor cause the processor to perform the steps of:
   receiving a second request from the single sign-on application for a credential associated with the user to access the web application;
   sending a third request to a data manager for the credential;
   sending a second response to the single sign-on application including the credential.

10. The non-transitory computer readable storage medium of claim 6, wherein the associated platform includes one or more of a client device type and a browser application type.

11. A system comprising:
   a computer, including a computer readable storage medium and processor; and
   a single sign-on proxy, executing on the computer, wherein the single sign-on proxy is configured to receive requests for web applications from clients and return augmented responses from the web applications to the clients;
   wherein when a request to access a web application is received from a client, the single sign-on proxy is configured to
   pass the request to the web application;
   receive a response from the web application;
   augment the response with policy data and a single sign-on application to create an augmented response; and
   return the augmented response;
   wherein the single sign-on application is configured to:
      identify a platform associated with the client device; and
      execute one or more operations that are specific to the associated platform;
   wherein the single sign-on application executes in a client browser and is further configured to:
      request a policy associated with the web application;
      match a page received from the web application to the policy;
      request, from a server, credentials associated with a user to access the web application;
      receive one or more credentials from the server and inject the received credentials into one or more fields on the page based on the policy; and
      submit the received credentials to the web application; and
   wherein the single sign-on application is further configured to invoke an automated logon chooser process that submits the received credentials to the single sign-on application such that, upon the single sign-on application detecting a successful logon with one of the received credentials, the single sign-on application sends an update request to the server to update the credentials associated with the user for the web application using the received credentials associated with the successful logon.

12. The system of claim 11, wherein the single sign-on application is a Javascript application.

13. The system of claim 11, wherein the single sign-on proxy is further configured to:
   receiving a request from the single sign-on application for the policy associated with the web application;
   sending a third request to a data manager for the policy;
   sending a second response to the single sign-on application including the policy.

14. The system of claim 11, wherein the single sign-on proxy is further configured to:
   receiving a second request from the single sign-on application for a credential associated with the user to access the web application;
   sending a third request to a data manager for the credential;
   sending a second response to the single sign-on application including the credential.

* * * * *

UNITED STATES PATENT AND TRADEMARK OFFICE
CERTIFICATE OF CORRECTION

PATENT NO. : 9,628,468 B2
APPLICATION NO. : 14/493218
DATED : April 18, 2017
INVENTOR(S) : Manza et al.

Page 1 of 1

It is certified that error appears in the above-identified patent and that said Letters Patent is hereby corrected as shown below:

On the Title Page

Column 1, under Applicant, Line 1, delete "Shore," and insert -- Shores, --, therefor.

In the Specification

In Column 5, Line 7, delete "infrastrcture)," and insert -- infrastructure), --, therefor.

In Column 12, Line 8, delete "and or" and insert -- and/or --, therefor.

In Column 13, Line 49, delete "delagee" and insert -- delegee --, therefor.

In Column 18, Line 14, delete "log out," and insert -- logout, --, therefor.

In the Claims

In Column 36, Line 59, in Claim 6, delete "from the server" and insert -- from a server --, therefor.

Signed and Sealed this
Twelfth Day of September, 2017

Joseph Matal
*Performing the Functions and Duties of the
Under Secretary of Commerce for Intellectual Property and
Director of the United States Patent and Trademark Office*